(12) United States Patent
McCloskey et al.

(10) Patent No.: US 9,841,311 B2
(45) Date of Patent: Dec. 12, 2017

(54) DIMENSIONING SYSTEM

(71) Applicant: Hand Held Products, Inc., Fort Mill, SC (US)

(72) Inventors: Scott McCloskey, Minneapolis, MN (US); Ryan Andrew Lloyd, Plymouth, MN (US)

(73) Assignee: Hand Held Products, Inc., Fort Mill, SC (US)

( * ) Notice: Subject to any disclaimer, the term of this patent is extended or adjusted under 35 U.S.C. 154(b) by 457 days.

(21) Appl. No.: 13/785,177

(22) Filed: Mar. 5, 2013

(65) Prior Publication Data

US 2014/0104414 A1  Apr. 17, 2014

Related U.S. Application Data

(60) Provisional application No. 61/714,394, filed on Oct. 16, 2012.

(51) Int. Cl.
*H04N 7/18* (2006.01)
*G01G 19/00* (2006.01)
(Continued)

(52) U.S. Cl.
CPC .......... *G01G 19/002* (2013.01); *G01B 11/00* (2013.01); *G01B 11/02* (2013.01); *G01B 11/022* (2013.01); *G01B 11/2513* (2013.01); *G01G 19/4148* (2013.01); *G06Q 10/083* (2013.01); *G06Q 30/04* (2013.01); *H04N 7/18* (2013.01);
(Continued)

(58) Field of Classification Search
CPC .............. G01B 11/022; G01G 19/002; G01G 19/4148; G06Q 10/083; G06Q 30/04
See application file for complete search history.

(56) References Cited

U.S. PATENT DOCUMENTS 3,971,065 A   7/1976 Bayer
4,279,328 A   7/1981 Ahlbom
(Continued)

FOREIGN PATENT DOCUMENTS

AU   2004212587 A1   4/2005
CN      201139117 Y   10/2008
(Continued)

OTHER PUBLICATIONS

Peter Clarke, Actuator Developer Claims Anti-Shake Breakthrough for Smartphone Cams, Electronic Engineering Times, p. 24, May 16, 2011.
(Continued)

*Primary Examiner* — Md Haque
*Assistant Examiner* — Nazmul Haque
(74) *Attorney, Agent, or Firm* — Additon, Higgins & Pendleton, P.A.

(57) ABSTRACT

A terminal for measuring at least one dimension of an object includes a range camera, a visible camera, and a display that are fixed in position and orientation relative to each other. The range camera is configured to produce a range image of an area in which the object is located. The visible camera is configured to produce a visible image of an area in which the object is located. The display is configured to present information associated with the range camera's field of view and the visible camera's field of view.

20 Claims, 16 Drawing Sheets

(51) Int. Cl.
*G01G 19/414* (2006.01)
*G01B 11/02* (2006.01)
*G06Q 10/08* (2012.01)
*G06Q 30/04* (2012.01)
*G01B 11/00* (2006.01)
*G01B 11/25* (2006.01)
*G07B 17/00* (2006.01)

(52) U.S. Cl.
CPC .............. *G07B 2017/00685* (2013.01); *G07B 2017/00701* (2013.01)

(56) References Cited

U.S. PATENT DOCUMENTS

| | | | |
|---|---|---|---|
| 4,398,811 A | 8/1983 | Nishioka et al. | |
| 4,495,559 A | 1/1985 | Gelatt, Jr. | |
| 4,730,190 A | 3/1988 | Win et al. | |
| 4,803,639 A | 2/1989 | Steele et al. | |
| 5,184,733 A | 2/1993 | Amarson et al. | |
| 5,220,536 A | 6/1993 | Stringer et al. | |
| 5,331,118 A | 7/1994 | Jensen | |
| 5,359,185 A | 10/1994 | Hanson | |
| 5,384,901 A | 1/1995 | Glassner et al. | |
| 5,548,707 A | 8/1996 | LoNegro | |
| 5,555,090 A | 9/1996 | Schmutz | |
| 5,561,526 A | 10/1996 | Huber et al. | |
| 5,590,060 A | 12/1996 | Granville et al. | |
| 5,606,534 A | 2/1997 | Stringer et al. | |
| 5,619,245 A | 4/1997 | Kessler et al. | |
| 5,655,095 A | 8/1997 | LoNegro et al. | |
| 5,661,561 A | 8/1997 | Wurz et al. | |
| 5,699,161 A | 12/1997 | Woodworth | |
| 5,729,750 A | 3/1998 | Ishida | |
| 5,730,252 A | 3/1998 | Herbinet | |
| 5,732,147 A | 3/1998 | Tao | |
| 5,734,476 A | 3/1998 | Dlugos | |
| 5,737,074 A | 4/1998 | Haga et al. | |
| 5,767,962 A | 6/1998 | Suzuki et al. | |
| 5,831,737 A | 11/1998 | Stringer et al. | |
| 5,850,370 A | 12/1998 | Stringer et al. | |
| 5,850,490 A | 12/1998 | Johnson | |
| 5,869,827 A | 2/1999 | Rando | |
| 5,870,220 A | 2/1999 | Migdal et al. | |
| 5,900,611 A | 5/1999 | Hecht | |
| 5,923,428 A | 7/1999 | Woodworth | |
| 5,929,856 A | 7/1999 | LoNegro et al. | |
| 5,938,710 A | 8/1999 | Lanza et al. | |
| 5,959,568 A | 9/1999 | Woolley | |
| 5,960,098 A | 9/1999 | Tao | |
| 5,969,823 A | 10/1999 | Wurz et al. | |
| 5,978,512 A | 11/1999 | Kim et al. | |
| 5,979,760 A | 11/1999 | Freyman et al. | |
| 5,988,862 A | 11/1999 | Kacyra et al. | |
| 5,991,041 A | 11/1999 | Woodworth | |
| 6,009,189 A | 12/1999 | Schaack | |
| 6,025,847 A | 2/2000 | Marks | |
| 6,049,386 A | 4/2000 | Stringer et al. | |
| 6,053,409 A | 4/2000 | Brobst et al. | |
| 6,064,759 A | 5/2000 | Buckley et al. | |
| 6,067,110 A | 5/2000 | Nonaka et al. | |
| 6,069,696 A | 5/2000 | McQueen et al. | |
| 6,115,114 A | 9/2000 | Berg et al. | |
| 6,137,577 A | 10/2000 | Woodworth | |
| 6,177,999 B1 | 1/2001 | Wurz et al. | |
| 6,189,223 B1 | 2/2001 | Haug | |
| 6,232,597 B1 | 5/2001 | Kley | |
| 6,236,403 B1 | 5/2001 | Chaki | |
| 6,246,468 B1 | 6/2001 | Dimsdale | |
| 6,333,749 B1 | 12/2001 | Reinhardt et al. | |
| 6,336,587 B1 | 1/2002 | He et al. | |
| 6,369,401 B1 * | 4/2002 | Lee ................... | G01B 11/0608 250/559.21 |
| 6,373,579 B1 | 4/2002 | Ober et al. | |
| 6,429,803 B1 | 8/2002 | Kumar | |
| 6,457,642 B1 | 10/2002 | Good et al. | |
| 6,507,406 B1 | 1/2003 | Yagi et al. | |
| 6,517,004 B2 | 2/2003 | Good et al. | |
| 6,519,550 B1 | 2/2003 | D'Hooge et al. | |
| 6,674,904 B1 | 1/2004 | McQueen | |
| 6,705,526 B1 | 3/2004 | Zhu et al. | |
| 6,781,621 B1 * | 8/2004 | Gobush .............. | A63B 69/3614 348/135 |
| 6,824,058 B2 | 11/2004 | Patel et al. | |
| 6,832,725 B2 | 12/2004 | Gardiner et al. | |
| 6,858,857 B2 | 2/2005 | Pease et al. | |
| 6,922,632 B2 | 7/2005 | Foxlin | |
| 6,971,580 B2 | 12/2005 | Zhu et al. | |
| 6,995,762 B1 | 2/2006 | Pavlidis et al. | |
| 7,057,632 B2 | 6/2006 | Yamawaki et al. | |
| 7,085,409 B2 | 8/2006 | Sawhney et al. | |
| 7,086,162 B2 | 8/2006 | Tyroler | |
| 7,104,453 B1 | 9/2006 | Zhu et al. | |
| 7,128,266 B2 | 10/2006 | Zhu et al. | |
| 7,137,556 B1 | 11/2006 | Bonner et al. | |
| 7,159,783 B2 | 1/2007 | Walczyk et al. | |
| 7,161,688 B1 | 1/2007 | Bonner et al. | |
| 7,205,529 B2 | 4/2007 | Andersen et al. | |
| 7,214,954 B2 | 5/2007 | Schopp | |
| 7,277,187 B2 | 10/2007 | Smith et al. | |
| 7,307,653 B2 | 12/2007 | Dutta | |
| 7,310,431 B2 * | 12/2007 | Gokturk .............. | G01B 11/2509 356/4.01 |
| 7,413,127 B2 | 8/2008 | Ehrhart et al. | |
| 7,527,205 B2 | 5/2009 | Zhu et al. | |
| 7,586,049 B2 | 9/2009 | Wurz | |
| 7,602,404 B1 | 10/2009 | Reinhardt et al. | |
| 7,639,722 B1 | 12/2009 | Paxton et al. | |
| 7,726,575 B2 | 6/2010 | Wang et al. | |
| 7,780,084 B2 | 8/2010 | Zhang et al. | |
| 7,788,883 B2 | 9/2010 | Buckley et al. | |
| 7,974,025 B2 | 7/2011 | Topliss | |
| 8,027,096 B2 | 9/2011 | Feng et al. | |
| 8,028,501 B2 | 10/2011 | Buckley et al. | |
| 8,050,461 B2 | 11/2011 | Shpunt et al. | |
| 8,055,061 B2 | 11/2011 | Katano | |
| 8,072,581 B1 | 12/2011 | Breiholz | |
| 8,102,395 B2 | 1/2012 | Kondo et al. | |
| 8,132,728 B2 | 3/2012 | Dwinell et al. | |
| 8,134,717 B2 | 3/2012 | Pangrazio et al. | |
| 8,149,224 B1 | 4/2012 | Kuo et al. | |
| 8,194,097 B2 | 6/2012 | Xiao et al. | |
| 8,212,889 B2 | 7/2012 | Chanas et al. | |
| 8,228,510 B2 | 7/2012 | Pangrazio et al. | |
| 8,230,367 B2 | 7/2012 | Bell et al. | |
| 8,294,969 B2 | 10/2012 | Plesko | |
| 8,305,458 B2 | 11/2012 | Hara | |
| 8,310,656 B2 | 11/2012 | Zalewski | |
| 8,313,380 B2 | 11/2012 | Zalewski et al. | |
| 8,317,105 B2 | 11/2012 | Kotlarsky et al. | |
| 8,322,622 B2 | 12/2012 | Liu | |
| 8,339,462 B2 | 12/2012 | Stec et al. | |
| 8,350,959 B2 | 1/2013 | Topliss et al. | |
| 8,351,670 B2 | 1/2013 | Ijiri et al. | |
| 8,366,005 B2 | 2/2013 | Kotlarsky et al. | |
| 8,371,507 B2 | 2/2013 | Haggerty et al. | |
| 8,376,233 B2 | 2/2013 | Van Horn et al. | |
| 8,381,976 B2 | 2/2013 | Mohideen et al. | |
| 8,381,979 B2 | 2/2013 | Franz | |
| 8,390,909 B2 | 3/2013 | Plesko | |
| 8,408,464 B2 | 4/2013 | Zhu et al. | |
| 8,408,468 B2 | 4/2013 | Van Horn et al. | |
| 8,408,469 B2 | 4/2013 | Good | |
| 8,424,768 B2 | 4/2013 | Rueblinger et al. | |
| 8,437,539 B2 | 5/2013 | Komatsu et al. | |
| 8,441,749 B2 | 5/2013 | Brown et al. | |
| 8,448,863 B2 | 5/2013 | Xian et al. | |
| 8,457,013 B2 | 6/2013 | Essinger et al. | |
| 8,459,557 B2 | 6/2013 | Havens et al. | |
| 8,463,079 B2 | 6/2013 | Ackley et al. | |
| 8,469,272 B2 | 6/2013 | Kearney | |
| 8,474,712 B2 | 7/2013 | Kearney et al. | |
| 8,479,992 B2 | 7/2013 | Kotlarsky et al. | |
| 8,490,877 B2 | 7/2013 | Kearney | |
| 8,517,271 B2 | 8/2013 | Kotlarsky et al. | |

(56) References Cited

U.S. PATENT DOCUMENTS

| | | | |
|---|---|---|---|
| 8,523,076 B2 | 9/2013 | Good |
| 8,528,818 B2 | 9/2013 | Ehrhart et al. |
| 8,544,737 B2 | 10/2013 | Gomez et al. |
| 8,548,420 B2 | 10/2013 | Grunow et al. |
| 8,550,335 B2 | 10/2013 | Samek et al. |
| 8,550,354 B2 | 10/2013 | Gannon et al. |
| 8,550,357 B2 | 10/2013 | Kearney |
| 8,556,174 B2 | 10/2013 | Kosecki et al. |
| 8,556,176 B2 | 10/2013 | Van Horn et al. |
| 8,556,177 B2 | 10/2013 | Hussey et al. |
| 8,559,767 B2 | 10/2013 | Barber et al. |
| 8,561,895 B2 | 10/2013 | Gomez et al. |
| 8,561,903 B2 | 10/2013 | Sauerwein |
| 8,561,905 B2 | 10/2013 | Edmonds et al. |
| 8,565,107 B2 | 10/2013 | Pease et al. |
| 8,570,343 B2 | 10/2013 | Halstead |
| 8,571,307 B2 | 10/2013 | Li et al. |
| 8,576,390 B1 | 11/2013 | Nunnink |
| 8,579,200 B2 | 11/2013 | Samek et al. |
| 8,583,924 B2 | 11/2013 | Caballero et al. |
| 8,584,945 B2 | 11/2013 | Wang et al. |
| 8,587,595 B2 | 11/2013 | Wang |
| 8,587,697 B2 | 11/2013 | Hussey et al. |
| 8,588,869 B2 | 11/2013 | Sauerwein et al. |
| 8,590,789 B2 | 11/2013 | Nahill et al. |
| 8,596,539 B2 | 12/2013 | Havens et al. |
| 8,596,542 B2 | 12/2013 | Havens et al. |
| 8,596,543 B2 | 12/2013 | Havens et al. |
| 8,599,271 B2 | 12/2013 | Havens et al. |
| 8,599,957 B2 | 12/2013 | Peake et al. |
| 8,600,158 B2 | 12/2013 | Li et al. |
| 8,600,167 B2 | 12/2013 | Showering |
| 8,602,309 B2 | 12/2013 | Longacre et al. |
| 8,608,053 B2 | 12/2013 | Meier et al. |
| 8,608,071 B2 | 12/2013 | Liu et al. |
| 8,611,309 B2 | 12/2013 | Wang et al. |
| 8,615,487 B2 | 12/2013 | Gomez et al. |
| 8,621,123 B2 | 12/2013 | Caballero |
| 8,622,303 B2 | 1/2014 | Meier et al. |
| 8,628,013 B2 | 1/2014 | Ding |
| 8,628,015 B2 | 1/2014 | Wang et al. |
| 8,628,016 B2 | 1/2014 | Winegar |
| 8,629,926 B2 | 1/2014 | Wang |
| 8,630,491 B2 | 1/2014 | Longacre et al. |
| 8,635,309 B2 | 1/2014 | Berthiaume et al. |
| 8,636,200 B2 | 1/2014 | Kearney |
| 8,636,212 B2 | 1/2014 | Nahill et al. |
| 8,636,215 B2 | 1/2014 | Ding et al. |
| 8,636,224 B2 | 1/2014 | Wang |
| 8,638,806 B2 | 1/2014 | Wang et al. |
| 8,640,958 B2 | 2/2014 | Lu et al. |
| 8,640,960 B2 | 2/2014 | Wang et al. |
| 8,643,717 B2 | 2/2014 | Li et al. |
| 8,646,692 B2 | 2/2014 | Meier et al. |
| 8,646,694 B2 | 2/2014 | Wang et al. |
| 8,657,200 B2 | 2/2014 | Ren et al. |
| 8,659,397 B2 | 2/2014 | Vargo et al. |
| 8,668,149 B2 | 3/2014 | Good |
| 8,678,285 B2 | 3/2014 | Kearney |
| 8,678,286 B2 | 3/2014 | Smith et al. |
| 8,682,077 B1 | 3/2014 | Longacre |
| D702,237 S | 4/2014 | Oberpriller et al. |
| 8,687,282 B2 | 4/2014 | Feng et al. |
| 8,692,927 B2 | 4/2014 | Pease et al. |
| 8,695,880 B2 | 4/2014 | Bremer et al. |
| 8,698,949 B2 | 4/2014 | Grunow et al. |
| 8,702,000 B2 | 4/2014 | Barber et al. |
| 8,717,494 B2 | 5/2014 | Gannon |
| 8,720,783 B2 | 5/2014 | Biss et al. |
| 8,723,804 B2 | 5/2014 | Fletcher et al. |
| 8,723,904 B2 | 5/2014 | Marty et al. |
| 8,727,223 B2 | 5/2014 | Wang |
| 8,792,688 B2 | 7/2014 | Unsworth |
| 8,810,779 B1 | 8/2014 | Hilde |
| 8,897,596 B1 | 11/2014 | Passmore et al. |
| 9,014,441 B2 | 4/2015 | Truyen et al. |
| 9,082,195 B2 | 7/2015 | Holeva et al. |
| 9,142,035 B1 | 9/2015 | Rotman |
| 9,233,470 B1 | 1/2016 | Bradski et al. |
| 9,299,013 B1 | 3/2016 | Curlander et al. |
| 9,424,749 B1 | 8/2016 | Reed et al. |
| 9,486,921 B1 | 11/2016 | Straszheim et al. |
| 2001/0027995 A1 | 10/2001 | Patel et al. |
| 2001/0032879 A1 | 10/2001 | He et al. |
| 2002/0054289 A1 | 5/2002 | Thibault et al. |
| 2002/0067855 A1 | 6/2002 | Chiu et al. |
| 2002/0109835 A1 | 8/2002 | Goetz |
| 2002/0118874 A1 | 8/2002 | Chung et al. |
| 2002/0158873 A1 | 10/2002 | Williamson |
| 2002/0167677 A1 | 11/2002 | Okada et al. |
| 2002/0179708 A1 | 12/2002 | Zhu et al. |
| 2002/0196534 A1 | 12/2002 | Lizotte et al. |
| 2003/0038179 A1 | 2/2003 | Tsikos et al. |
| 2003/0053513 A1 | 3/2003 | Vatan et al. |
| 2003/0063086 A1 | 4/2003 | Baumberg |
| 2003/0091227 A1 | 5/2003 | Chang et al. |
| 2003/0156756 A1 | 8/2003 | Gokturk et al. |
| 2003/0197138 A1 | 10/2003 | Pease et al. |
| 2003/0225712 A1 | 12/2003 | Cooper et al. |
| 2003/0235331 A1 | 12/2003 | Kawaike et al. |
| 2004/0008259 A1 | 1/2004 | Gokturk et al. |
| 2004/0019274 A1 | 1/2004 | Galloway et al. |
| 2004/0024754 A1 | 2/2004 | Mane et al. |
| 2004/0066329 A1 | 4/2004 | Zeitfuss et al. |
| 2004/0073359 A1 | 4/2004 | Ichijo et al. |
| 2004/0083025 A1 | 4/2004 | Yamanouchi et al. |
| 2004/0089482 A1 | 5/2004 | Ramsden et al. |
| 2004/0098146 A1 | 5/2004 | Katae et al. |
| 2004/0105580 A1 | 6/2004 | Hager et al. |
| 2004/0118928 A1 | 6/2004 | Patel et al. |
| 2004/0122779 A1* | 6/2004 | Stickler .............. G01G 19/4148 705/402 |
| 2004/0155975 A1 | 8/2004 | Hart et al. |
| 2004/0165090 A1 | 8/2004 | Ning |
| 2004/0184041 A1 | 9/2004 | Schopp |
| 2004/0211836 A1 | 10/2004 | Patel et al. |
| 2004/0214623 A1 | 10/2004 | Takahashi et al. |
| 2004/0233461 A1 | 11/2004 | Armstrong et al. |
| 2004/0258353 A1 | 12/2004 | Gluckstad et al. |
| 2005/0006477 A1 | 1/2005 | Patel |
| 2005/0117215 A1 | 6/2005 | Lange |
| 2005/0128196 A1 | 6/2005 | Popescu et al. |
| 2005/0168488 A1 | 8/2005 | Montague |
| 2005/0211782 A1 | 9/2005 | Martin |
| 2005/0264867 A1 | 12/2005 | Cho et al. |
| 2006/0047704 A1 | 3/2006 | Gopalakrishnan |
| 2006/0078226 A1 | 4/2006 | Zhou |
| 2006/0108266 A1 | 5/2006 | Bowers et al. |
| 2006/0112023 A1* | 5/2006 | Horhann .............. G01G 19/005 705/407 |
| 2006/0151604 A1 | 7/2006 | Zhu et al. |
| 2006/0159307 A1 | 7/2006 | Anderson et al. |
| 2006/0159344 A1 | 7/2006 | Shao et al. |
| 2006/0232681 A1 | 10/2006 | Okada |
| 2006/0255150 A1 | 11/2006 | Longacre |
| 2006/0269165 A1 | 11/2006 | Viswanathan |
| 2006/0291719 A1 | 12/2006 | Ikeda et al. |
| 2007/0003154 A1 | 1/2007 | Sun et al. |
| 2007/0025612 A1 | 2/2007 | Iwasaki et al. |
| 2007/0031064 A1 | 2/2007 | Zhao et al. |
| 2007/0063048 A1 | 3/2007 | Havens et al. |
| 2007/0116357 A1 | 5/2007 | Dewaele |
| 2007/0127022 A1 | 6/2007 | Cohen et al. |
| 2007/0143082 A1 | 6/2007 | Degnan |
| 2007/0153293 A1 | 7/2007 | Gruhlke et al. |
| 2007/0171220 A1 | 7/2007 | Kriveshko |
| 2007/0177011 A1 | 8/2007 | Lewin et al. |
| 2007/0181685 A1 | 8/2007 | Zhu et al. |
| 2007/0237356 A1 | 10/2007 | Dwinell et al. |
| 2007/0291031 A1 | 12/2007 | Konev et al. |
| 2007/0299338 A1 | 12/2007 | Stevick et al. |
| 2008/0013793 A1 | 1/2008 | Hillis et al. |
| 2008/0035390 A1 | 2/2008 | Wurz |
| 2008/0056536 A1 | 3/2008 | Hildreth et al. |

(56) References Cited

U.S. PATENT DOCUMENTS

| | | |
|---|---|---|
| 2008/0062164 A1 | 3/2008 | Bassi et al. |
| 2008/0077265 A1 | 3/2008 | Boyden |
| 2008/0079955 A1 | 4/2008 | Storm |
| 2008/0164074 A1 | 7/2008 | Wurz |
| 2008/0185432 A1 | 8/2008 | Caballero et al. |
| 2008/0204476 A1 | 8/2008 | Montague |
| 2008/0212168 A1 | 9/2008 | Olmstead et al. |
| 2008/0247635 A1 | 10/2008 | Davis et al. |
| 2008/0273191 A1 | 11/2008 | Kim et al. |
| 2008/0273210 A1 | 11/2008 | Hilde |
| 2008/0278790 A1 | 11/2008 | Boesser et al. |
| 2009/0059004 A1 | 3/2009 | Bochicchio |
| 2009/0095047 A1 | 4/2009 | Patel et al. |
| 2009/0134221 A1 | 5/2009 | Zhu et al. |
| 2009/0195790 A1* | 8/2009 | Zhu .................. G01B 11/24 356/612 |
| 2009/0225333 A1 | 9/2009 | Bendall et al. |
| 2009/0237411 A1 | 9/2009 | Gossweiler et al. |
| 2009/0268023 A1 | 10/2009 | Hsieh |
| 2009/0272724 A1 | 11/2009 | Gubler |
| 2009/0273770 A1 | 11/2009 | Bauhahn et al. |
| 2009/0313948 A1 | 12/2009 | Buckley et al. |
| 2009/0318815 A1 | 12/2009 | Barnes et al. |
| 2009/0323084 A1 | 12/2009 | Dunn et al. |
| 2009/0323121 A1 | 12/2009 | Valkenburg |
| 2010/0035637 A1 | 2/2010 | Varanasi et al. |
| 2010/0060604 A1 | 3/2010 | Zwart et al. |
| 2010/0091104 A1 | 4/2010 | Sprigle |
| 2010/0113153 A1 | 5/2010 | Yen et al. |
| 2010/0118200 A1 | 5/2010 | Gelman et al. |
| 2010/0128109 A1 | 5/2010 | Banks |
| 2010/0161170 A1 | 6/2010 | Siris |
| 2010/0171740 A1 | 7/2010 | Andersen et al. |
| 2010/0172567 A1 | 7/2010 | Prokoski |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2010/0202702 A1 | 8/2010 | Benos et al. |
| 2010/0208039 A1 | 8/2010 | Stettner |
| 2010/0211355 A1 | 8/2010 | Horst et al. |
| 2010/0217678 A1 | 8/2010 | Goncalves |
| 2010/0220849 A1 | 9/2010 | Colbert et al. |
| 2010/0220894 A1 | 9/2010 | Ackley et al. |
| 2010/0223276 A1 | 9/2010 | Al-Shameri et al. |
| 2010/0245850 A1* | 9/2010 | Lee .................. F42B 35/02 356/625 |
| 2010/0254611 A1 | 10/2010 | Arnz |
| 2010/0303336 A1 | 12/2010 | Abraham |
| 2010/0315413 A1 | 12/2010 | Izadi et al. |
| 2010/0321482 A1 | 12/2010 | Cleveland |
| 2011/0019155 A1 | 1/2011 | Daniel et al. |
| 2011/0040192 A1 | 2/2011 | Brenner et al. |
| 2011/0043609 A1 | 2/2011 | Choi et al. |
| 2011/0099474 A1 | 4/2011 | Grossman et al. |
| 2011/0169999 A1 | 7/2011 | Grunow et al. |
| 2011/0188054 A1 | 8/2011 | Petronius et al. |
| 2011/0188741 A1* | 8/2011 | Sones .................. G06K 9/00 382/154 |
| 2011/0202554 A1 | 8/2011 | Powilleit et al. |
| 2011/0234389 A1 | 9/2011 | Mellin |
| 2011/0235854 A1 | 9/2011 | Berger et al. |
| 2011/0249864 A1 | 10/2011 | Venkatesan et al. |
| 2011/0254840 A1 | 10/2011 | Halstead |
| 2011/0279916 A1 | 11/2011 | Brown et al. |
| 2011/0286007 A1* | 11/2011 | Pangrazio .............. G01B 11/00 356/614 |
| 2011/0286628 A1 | 11/2011 | Goncalves et al. |
| 2011/0288818 A1 | 11/2011 | Thierman |
| 2011/0301994 A1 | 12/2011 | Tieman |
| 2011/0303748 A1 | 12/2011 | Lemma et al. |
| 2011/0310227 A1 | 12/2011 | Konertz et al. |
| 2012/0024952 A1 | 2/2012 | Chen |
| 2012/0056982 A1 | 3/2012 | Katz et al. |
| 2012/0057345 A1 | 3/2012 | Kuchibhotla |
| 2012/0067955 A1 | 3/2012 | Rowe |
| 2012/0074227 A1 | 3/2012 | Ferren et al. |
| 2012/0081714 A1 | 4/2012 | Pangrazio et al. |
| 2012/0111946 A1 | 5/2012 | Golant |
| 2012/0113223 A1 | 5/2012 | Hilliges et al. |
| 2012/0113250 A1 | 5/2012 | Farlotti et al. |
| 2012/0126000 A1 | 5/2012 | Kunzig et al. |
| 2012/0138685 A1 | 6/2012 | Qu et al. |
| 2012/0140300 A1 | 6/2012 | Freeman |
| 2012/0168511 A1 | 7/2012 | Kotlarsky et al. |
| 2012/0168512 A1 | 7/2012 | Kotlarsky et al. |
| 2012/0179665 A1 | 7/2012 | Baarman et al. |
| 2012/0185094 A1 | 7/2012 | Rosenstein et al. |
| 2012/0190386 A1 | 7/2012 | Anderson |
| 2012/0193407 A1 | 8/2012 | Barten |
| 2012/0193423 A1 | 8/2012 | Samek |
| 2012/0197464 A1 | 8/2012 | Wang et al. |
| 2012/0203647 A1 | 8/2012 | Smith |
| 2012/0218436 A1 | 8/2012 | Rodriguez et al. |
| 2012/0223141 A1 | 9/2012 | Good et al. |
| 2012/0224026 A1 | 9/2012 | Bayer et al. |
| 2012/0228382 A1 | 9/2012 | Havens et al. |
| 2012/0236288 A1 | 9/2012 | Stanley |
| 2012/0242852 A1 | 9/2012 | Hayward et al. |
| 2012/0248188 A1 | 10/2012 | Kearney |
| 2012/0256901 A1 | 10/2012 | Bendall |
| 2012/0262558 A1 | 10/2012 | Boger et al. |
| 2012/0280908 A1 | 11/2012 | Rhoads et al. |
| 2012/0282905 A1 | 11/2012 | Owen |
| 2012/0282911 A1 | 11/2012 | Davis et al. |
| 2012/0284012 A1 | 11/2012 | Rodriguez et al. |
| 2012/0284122 A1 | 11/2012 | Brandis |
| 2012/0284339 A1 | 11/2012 | Rodriguez |
| 2012/0284593 A1 | 11/2012 | Rodriguez |
| 2012/0293610 A1 | 11/2012 | Doepke et al. |
| 2012/0294549 A1 | 11/2012 | Doepke |
| 2012/0299961 A1 | 11/2012 | Ramkumar et al. |
| 2012/0300991 A1 | 11/2012 | Free |
| 2012/0313848 A1 | 12/2012 | Galor et al. |
| 2012/0314030 A1 | 12/2012 | Datta |
| 2012/0314058 A1 | 12/2012 | Bendall et al. |
| 2012/0316820 A1 | 12/2012 | Nakazato et al. |
| 2013/0019278 A1 | 1/2013 | Sun et al. |
| 2013/0038881 A1 | 2/2013 | Pesach et al. |
| 2013/0038941 A1 | 2/2013 | Pesach et al. |
| 2013/0043312 A1 | 2/2013 | Van Horn |
| 2013/0050426 A1 | 2/2013 | Sarmast et al. |
| 2013/0056285 A1 | 3/2013 | Meagher |
| 2013/0070322 A1 | 3/2013 | Fritz et al. |
| 2013/0075168 A1 | 3/2013 | Amundsen et al. |
| 2013/0082104 A1 | 4/2013 | Kearney et al. |
| 2013/0094069 A1 | 4/2013 | Lee et al. |
| 2013/0101158 A1 | 4/2013 | Lloyd et al. |
| 2013/0156267 A1 | 6/2013 | Muraoka et al. |
| 2013/0175341 A1 | 7/2013 | Kearney et al. |
| 2013/0175343 A1 | 7/2013 | Good |
| 2013/0200150 A1 | 8/2013 | Reynolds et al. |
| 2013/0200158 A1 | 8/2013 | Feng et al. |
| 2013/0201288 A1 | 8/2013 | Billerbeck et al. |
| 2013/0208164 A1 | 8/2013 | Cazier et al. |
| 2013/0211790 A1 | 8/2013 | Loveland et al. |
| 2013/0214048 A1 | 8/2013 | Wilz |
| 2013/0223673 A1 | 8/2013 | Davis et al. |
| 2013/0256418 A1 | 10/2013 | Havens et al. |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0278425 A1 | 10/2013 | Cunningham et al. |
| 2013/0287258 A1 | 10/2013 | Kearney |
| 2013/0291998 A1 | 11/2013 | Konnerth |
| 2013/0292474 A1 | 11/2013 | Xian et al. |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306730 A1 | 11/2013 | Brady et al. |
| 2013/0306731 A1 | 11/2013 | Pedraro |
| 2013/0306734 A1 | 11/2013 | Xian et al. |

(56) References Cited

U.S. PATENT DOCUMENTS

| | | |
|---|---|---|
| 2013/0307964 A1 | 11/2013 | Bremer et al. |
| 2013/0308013 A1 | 11/2013 | Li et al. |
| 2013/0308625 A1 | 11/2013 | Park et al. |
| 2013/0313324 A1 | 11/2013 | Koziol et al. |
| 2013/0313325 A1 | 11/2013 | Wilz et al. |
| 2013/0313326 A1 | 11/2013 | Ehrhart |
| 2013/0327834 A1 | 12/2013 | Hennick et al. |
| 2013/0329012 A1 | 12/2013 | Bartos |
| 2013/0329013 A1 | 12/2013 | Metois et al. |
| 2013/0341399 A1 | 12/2013 | Xian et al. |
| 2013/0342343 A1 | 12/2013 | Harring et al. |
| 2013/0342717 A1 | 12/2013 | Havens et al. |
| 2014/0001267 A1 | 1/2014 | Giordano et al. |
| 2014/0002828 A1 | 1/2014 | Laffargue et al. |
| 2014/0008430 A1 | 1/2014 | Soule et al. |
| 2014/0008439 A1 | 1/2014 | Wang |
| 2014/0009586 A1 | 1/2014 | NcNamer et al. |
| 2014/0021256 A1 | 1/2014 | Qu et al. |
| 2014/0021259 A1 | 1/2014 | Moed et al. |
| 2014/0025584 A1 | 1/2014 | Liu et al. |
| 2014/0027518 A1 | 1/2014 | Edmonds et al. |
| 2014/0031665 A1 | 1/2014 | Pinto et al. |
| 2014/0034723 A1 | 2/2014 | Van Horn et al. |
| 2014/0034731 A1 | 2/2014 | Gao et al. |
| 2014/0034734 A1 | 2/2014 | Sauerwein |
| 2014/0036848 A1 | 2/2014 | Pease et al. |
| 2014/0039693 A1 | 2/2014 | Havens et al. |
| 2014/0042814 A1 | 2/2014 | Kather et al. |
| 2014/0049120 A1 | 2/2014 | Kohtz et al. |
| 2014/0049635 A1 | 2/2014 | Laffargue et al. |
| 2014/0058612 A1 | 2/2014 | Wong et al. |
| 2014/0061305 A1 | 3/2014 | Nahill et al. |
| 2014/0061306 A1 | 3/2014 | Wu et al. |
| 2014/0061307 A1 | 3/2014 | Wang et al. |
| 2014/0062709 A1 | 3/2014 | Hyer et al. |
| 2014/0063289 A1 | 3/2014 | Hussey et al. |
| 2014/0066136 A1 | 3/2014 | Sauerwein et al. |
| 2014/0067104 A1 | 3/2014 | Osterhout |
| 2014/0067692 A1 | 3/2014 | Ye et al. |
| 2014/0070005 A1 | 3/2014 | Nahill et al. |
| 2014/0071430 A1 | 3/2014 | Hansen et al. |
| 2014/0071840 A1 | 3/2014 | Venancio |
| 2014/0074746 A1 | 3/2014 | Wang |
| 2014/0075846 A1 | 3/2014 | Woodburn |
| 2014/0076974 A1 | 3/2014 | Havens et al. |
| 2014/0078341 A1 | 3/2014 | Havens et al. |
| 2014/0078342 A1 | 3/2014 | Li et al. |
| 2014/0078345 A1 | 3/2014 | Showering |
| 2014/0084068 A1 | 3/2014 | Gillet et al. |
| 2014/0086348 A1 | 3/2014 | Peake et al. |
| 2014/0091147 A1 | 4/2014 | Evans et al. |
| 2014/0097238 A1 | 4/2014 | Ghazizadeh |
| 2014/0097249 A1 | 4/2014 | Gomez et al. |
| 2014/0098091 A1 | 4/2014 | Hori |
| 2014/0098284 A1 | 4/2014 | Oberpriller et al. |
| 2014/0098792 A1 | 4/2014 | Wang et al. |
| 2014/0100774 A1 | 4/2014 | Showering |
| 2014/0100813 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Giordano et al. |
| 2014/0104451 A1 | 4/2014 | Todeschini et al. |
| 2014/0104664 A1 | 4/2014 | Lee |
| 2014/0106594 A1 | 4/2014 | Skvoretz |
| 2014/0106725 A1 | 4/2014 | Sauerwein |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0124577 A1 | 5/2014 | Wang et al. |
| 2014/0124579 A1 | 5/2014 | Ding |
| 2014/0125842 A1 | 5/2014 | Winegar |
| 2014/0125853 A1 | 5/2014 | Wang |
| 2014/0125999 A1 | 5/2014 | Longacre et al. |
| 2014/0129378 A1 | 5/2014 | Richardson |
| 2014/0131438 A1 | 5/2014 | Kearney |
| 2014/0131441 A1 | 5/2014 | Nahill et al. |
| 2014/0131445 A1 | 5/2014 | Ding et al. |
| 2014/0133379 A1 | 5/2014 | Wang et al. |
| 2014/0135984 A1 | 5/2014 | Hirata |
| 2014/0139654 A1 | 5/2014 | Takahashi |
| 2014/0140585 A1 | 5/2014 | Wang |
| 2014/0151453 A1 | 6/2014 | Meier et al. |
| 2014/0152975 A1 | 6/2014 | Ko |
| 2014/0158468 A1 | 6/2014 | Adami |
| 2014/0160329 A1 | 6/2014 | Ren et al. |
| 2014/0168380 A1 | 6/2014 | Heidemann et al. |
| 2014/0192187 A1 | 7/2014 | Atwell et al. |
| 2014/0192551 A1 | 7/2014 | Masaki |
| 2014/0205150 A1 | 7/2014 | Ogawa |
| 2014/0225918 A1 | 8/2014 | Mittal et al. |
| 2014/0225985 A1 | 8/2014 | Klusza et al. |
| 2014/0240454 A1 | 8/2014 | Hirata et al. |
| 2014/0247279 A1 | 9/2014 | Nicholas et al. |
| 2014/0247280 A1 | 9/2014 | Nicholas et al. |
| 2014/0267609 A1 | 9/2014 | Laffargue |
| 2014/0268093 A1 | 9/2014 | Tohme et al. |
| 2014/0270361 A1 | 9/2014 | Amma et al. |
| 2014/0306833 A1 | 10/2014 | Ricci |
| 2014/0307855 A1 | 10/2014 | Withagen et al. |
| 2014/0313527 A1 | 10/2014 | Askan |
| 2014/0319219 A1 | 10/2014 | Liu et al. |
| 2014/0320408 A1 | 10/2014 | Zagorsek et al. |
| 2014/0347553 A1 | 11/2014 | Ovsiannikov et al. |
| 2014/0350710 A1 | 11/2014 | Gopalkrishnan et al. |
| 2014/0379613 A1 | 12/2014 | Nishitani et al. |
| 2015/0009100 A1 | 1/2015 | Haneda et al. |
| 2015/0009301 A1 | 1/2015 | Ribnick et al. |
| 2015/0009338 A1 | 1/2015 | Laffargue et al. |
| 2015/0036876 A1 | 2/2015 | Marrion et al. |
| 2015/0049347 A1 | 2/2015 | Laffargue et al. |
| 2015/0062369 A1 | 3/2015 | Gehring et al. |
| 2015/0063676 A1 | 3/2015 | Lloyd et al. |
| 2015/0116498 A1 | 4/2015 | Vartiainen et al. |
| 2015/0149946 A1 | 5/2015 | Benos et al. |
| 2015/0163474 A1 | 6/2015 | You |
| 2015/0201181 A1 | 7/2015 | Moore et al. |
| 2015/0204662 A1 | 7/2015 | Kobayashi et al. |
| 2015/0213647 A1 | 7/2015 | Laffargue et al. |
| 2015/0229838 A1 | 8/2015 | Hakim et al. |
| 2015/0269403 A1 | 9/2015 | Lei et al. |
| 2015/0276379 A1 | 10/2015 | Ni et al. |
| 2015/0308816 A1 | 10/2015 | Laffargue et al. |
| 2015/0325036 A1 | 11/2015 | Lee |
| 2015/0355470 A1 | 12/2015 | Herschbach |
| 2016/0048725 A1 | 2/2016 | Holz et al. |
| 2016/0063429 A1 | 3/2016 | Varley et al. |
| 2016/0090283 A1 | 3/2016 | Svensson et al. |
| 2016/0090284 A1 | 3/2016 | Svensson et al. |
| 2016/0138247 A1 | 5/2016 | Conway et al. |
| 2016/0138248 A1 | 5/2016 | Conway et al. |
| 2016/0138249 A1 | 5/2016 | Svensson et al. |
| 2016/0169665 A1 | 6/2016 | Deschenes et al. |
| 2016/0187186 A1 | 6/2016 | Coleman et al. |
| 2016/0187210 A1 | 6/2016 | Coleman et al. |
| 2016/0191801 A1 | 6/2016 | Sivan |
| 2016/0202478 A1 | 7/2016 | Masson et al. |
| 2017/0115490 A1 | 4/2017 | Hsieh et al. |
| 2010/7018294 | 6/2017 | Hardy et al. |

FOREIGN PATENT DOCUMENTS

| | | |
|---|---|---|
| DE | 3335760 A1 | 4/1985 |
| DE | 10210813 A1 | 10/2003 |
| DE | 102007037282 A1 | 3/2008 |
| EP | 1111435 A2 | 6/2001 |
| EP | 1443312 A1 | 8/2004 |
| EP | 2286932 A2 | 2/2011 |
| EP | 2381421 A2 | 10/2011 |
| EP | 2533009 A2 | 12/2012 |
| EP | 2722656 A1 | 4/2014 |
| EP | 2779027 A1 | 9/2014 |

(56) References Cited

FOREIGN PATENT DOCUMENTS

| | | |
|---|---|---|
| EP | 2833323 A2 | 2/2015 |
| EP | 2843590 A1 | 3/2015 |
| EP | 2845170 A1 | 3/2015 |
| EP | 2966595 A1 | 1/2016 |
| EP | 3006893 A1 | 3/2016 |
| EP | 3012601 A1 | 3/2016 |
| EP | 3007096 A1 | 4/2016 |
| GB | 2503978 A | 1/2014 |
| GB | 2525053 A | 10/2015 |
| GB | 2531928 A | 5/2016 |
| JP | H04129902 A | 4/1992 |
| JP | 200696457 A | 4/2006 |
| JP | 2007084162 A | 4/2007 |
| JP | 2008210276 A | 9/2008 |
| JP | 2014210646 A | 11/2014 |
| JP | 2015174705 A | 10/2015 |
| KR | 20100020115 A | 2/2010 |
| KR | 20110013200 A | 2/2011 |
| KR | 20110117020 A | 10/2011 |
| KR | 20120028109 A | 3/2012 |
| WO | 96/40452 A1 | 12/1996 |
| WO | 0077726 A1 | 12/2000 |
| WO | 0114836 A1 | 3/2001 |
| WO | 2006095110 A1 | 9/2006 |
| WO | 2007015059 A1 | 2/2007 |
| WO | 2011017241 A1 | 2/2011 |
| WO | 2012175731 A1 | 12/2012 |
| WO | 2013021157 A1 | 2/2013 |
| WO | 2013033442 A1 | 3/2013 |
| WO | 2013163789 A1 | 11/2013 |
| WO | 2013166368 A1 | 11/2013 |
| WO | 2013173985 A1 | 11/2013 |
| WO | 20130184340 A1 | 12/2013 |
| WO | 2014019130 A1 | 2/2014 |
| WO | 2014102341 A1 | 7/2014 |
| WO | 2014149702 A1 | 9/2014 |
| WO | 2014151746 A2 | 9/2014 |
| WO | 2015006865 A1 | 1/2015 |
| WO | 2016020038 A1 | 2/2016 |
| WO | 2016061699 A1 | 4/2016 |

OTHER PUBLICATIONS

U.S. Appl. No. 14/055,234, not yet published, Hand Held Products, Inc. filed Oct. 16, 2013; 26 pages.
U.S. Appl. No. 14/519,179, Serge Thuries et al., filed Oct. 21, 2014, not published yet. 40 pages.
U.S. Appl. No. 14/519,249, H. Sprague Ackley et al., filed Oct. 21, 2014, not published yet. 36 pages.
U.S. Appl. No. 14/519,233, Franck Laffargue et al., filed Oct. 21, 2014, not published yet. 34 pages.
U.S. Appl. No. 14/519,211, H. Sprague Ackley et al., filed Oct. 21, 2014, not published yet. 33 pages.
U.S. Appl. No. 14/519,195, Franck Laffargue et al., filed Oct. 21, 2014, not published yet. 35 pages.
European Search Report for application No. EP13186043 (now EP2722656 (Apr. 23, 2014)): Total pp. 7.
European Patent Office Action for Application No. 14157971.4-1906, Dated Jul. 16, 2014, 5 pages.
European Patent Search Report for Application No. 14157971.4-1906, Dated Jun. 30, 2014, 6 pages.
Caulier, Yannick et al., "A New Type of Color-Coded Light Structures for an Adapted and Rapid Determination of Point Correspondences for 3D Reconstruction." Proc. of SPIE, vol. 8082 808232-3; 2011; 8 pages.
Kazantsev, Aleksei et al. "Robust Pseudo-Random Coded Colored STructured Light Techniques for 3D Object Model Recovery"; ROSE 2008 IEEE International Workshop on Robotic and Sensors Environments (Oct. 17-18, 2008) , 6 pages.
Mouaddib E. et al. "Recent Progress in Structured Light in order to Solve the Correspondence Problem in Stereo Vision" Proceedings of the 1997 IEEE International Conference on Robotics and Automation, Apr. 1997; 7 pages.
International Search Report for PCT/US2013/039438 (WO2013166368), Oct. 1, 2013, 7 pages.
U.S. Appl. No. 13/912,262, not yet published, filed Jun. 7, 2013, Hand Held Products Inc., Method of Error Correction for 3D Imaging Device: 33 pages.
U.S. Appl. No. 14/453,019, not yet published, filed Aug. 6, 2014, Hand Held Products Inc., Dimensioning System With Guided Alignment: 31 pages.
European Office Action for application EP 13186043, dated Jun. 12, 2014(now EP2722656 (Apr. 23, 2014)), Total of 6 pages.
U.S. Appl. No. 14/461,524, not yet published, filed Aug. 18, 2014, Hand Held Products Inc., System and Method for Package Dimensioning: 21 pages.
U.S. Appl. No. 14/274,858 for Mobile Printer With Optional Battery Accessory, filed May 12, 2014, (Marty et al.), 26 pages.
U.S. Appl. No. 14/264,173 for Autofocus Lens System for Indicia Readers filed Apr. 29, 2014, (Ackley et al.), 39 pages.
U.S. Appl. No. 14/230,322 for Focus Module and Components with Actuator filed Mar. 31, 2014 (Feng et al.); 92 pages.
U.S. Appl. No. 14/222,994 for Method and Apparatus for Reading Optical Indicia Using a Plurality of Data filed Mar. 24, 2014 (Smith et al.); 30 pages.
U.S. Appl. No. 14/231,898 for Hand-Mounted Indicia-Reading Device with Finger Motion Triggering filed Apr. 1, 2014 (Van Horn et al.); 36 pages.
U.S. Appl. No. 29/486,759 for an Imaging Terminal, filed Apr. 2, 2014 (Oberpriller et al.); 8 pages.
U.S. Appl. No. 29/436,337 for an Electronic Device, filed Nov. 5, 2012 (Fitch et al.); 19 pages.
U.S. Appl. No. 29/458,405 for an Electronic Device, filed Jun. 19, 2013 (Fitch et al.); 22 pages.
U.S. Appl. No. 29/459,620 for an Electronic Device Enclosure, filed Jul. 2, 2013 (London et al.); 21 pages.
U.S. Appl. No. 29/459,681 for an Electronic Device Enclosure, filed Jul. 2, 2013 (Chaney et al.); 14 pages.
U.S. Appl. No. 29/459,785 for a Scanner and Charging Base, filed Jul. 3, 2013 (Fitch et al.); 21 pages.
U.S. Appl. No. 29/459,823 for a Scanner, filed Jul. 3, 2013 (Zhou et al.); 13 pages.
U.S. Appl. No. 29/468,118 for an Electronic Device Case, filed Sep. 26, 2013 (Oberpriller et al.); 44 pages.
U.S. Appl. No. 13/367,978, filed Feb. 7, 2012, (Feng et al.); now abandoned.
U.S. Appl. No. 13/736,139 for an Electronic Device Enclosure, filed Jan. 8, 2013 (Chaney); 40 pages.
U.S. Appl. No. 13/771,508 for an Optical Redirection Adapter, filed Feb. 20, 2013 (Anderson); 26 pages.
U.S. Appl. No. 13/780,356 for a Mobile Device Having Object Identification Interface, filed Feb. 28, 2013 (Samek et al.); 21 pages.
U.S. Appl. No. 13/852,097 for a System and Method for Capturing and Preserving Vehicle Event Data, filed Mar. 28, 2013 (Barker et al.); 20 pages.
U.S. Appl. No. 13/902,110 for a System and Method for Display of Information Using a Vehicle-Mount Computer, filed May 24, 2013 (Hollifield); 29 pages.
U.S. Appl. No. 13/902,144, for a System and Method for Display of Information Using a Vehicle-Mount Computer, filed May 24, 2013 (Chamberlin); 23 pages.
U.S. Appl. No. 13/902,242 for a System for Providing a Continuous Communication Link With a Symbol Reading Device, filed May 24, 2013 (Smith et al.); 24 pages.
U.S. Appl. No. 13/912,262 for a Method of Error Correction for 3D Imaging Device, filed Jun. 7, 2013 (Jovanovski et al.); 33 pages.
U.S. Appl. No. 13/912,702 for a System and Method for Reading Code Symbols at Long Range Using Source Power Control, filed Jun. 7, 2013 (Xian et al.); 24 pages.
U.S. Appl. No. 13/922,339 for a System and Method for Reading Code Symbols Using a Variable Field of View, filed Jun. 20, 2013 (Xian et al.); 23 pages.
U.S. Appl. No. 13/927,398 for a Code Symbol Reading System Having Adaptive Autofocus, filed Jun. 26, 2013 (Todeschini); 24 pages.

(56) References Cited

OTHER PUBLICATIONS

U.S. Appl. No. 13/930,913 for a Mobile Device Having an Improved User Interface for Reading Code Symbols, filed Jun. 28, 2013 (Gelay et al.); 24 pages.
U.S. Appl. No. 13/933,415 for an Electronic Device Case, filed Jul. 2, 2013 (London et al.); 47 pages.
U.S. Appl. No. 13/947,296 for a System and Method for Selectively Reading Code Symbols, filed Jul. 22, 2013 (Rueblinger et al.); 29 pages.
U.S. Appl. No. 13/950,544 for a Code Symbol Reading System Having Adjustable Object Detection, filed Jul. 25, 2013 (Jiang); 28 pages.
U.S. Appl. No. 13/961,408 for a Method for Manufacturing Laser Scanners, filed Aug. 7, 2013 (Saber et al.); 26 pages.
U.S. Appl. No. 14/018,729 for a Method for Operating a Laser Scanner, filed Sep. 5, 2013 (Feng et al.); 24 pages.
U.S. Appl. No. 14/019,616 for a Device Having Light Source to Reduce Surface Pathogens, filed Sep. 6, 2013 (Todeschini); 23 pages.
U.S. Appl. No. 14/023,762 for a Handheld Indicia Reader Having Locking Endcap, filed Sep. 11, 2013 (Gannon); 31 pages.
U.S. Appl. No. 14/035,474 for Augmented-Reality Signature Capture, filed Sep. 24, 2013 (Todeschini); 33 pages.
U.S. Appl. No. 14/047,896 for Terminal Having Illumination and Exposure Control filed Oct. 7, 2013 (Jovanovski et al.); 32 pages.
U.S. Appl. No. 14/053,175 for Imaging Apparatus Having Imaging Assembly, filed Oct. 14, 2013 (Barber); 39 pages.
U.S. Appl. No. 14/055,234 for Dimensioning System, filed Oct. 16, 2013 (Fletcher); 26 pages.
U.S. Appl. No. 14/053,314 for Indicia Reader, filed Oct. 14, 2013 (Huck); 29 pages.
U.S. Appl. No. 14/065,768 for Hybrid System and Method for Reading Indicia, filed Oct. 29, 2013 (Meier et al.); 22 pages.
U.S. Appl. No. 14/074,746 for Self-Checkout Shopping System, filed Nov. 8, 2013 (Hejl et al.); 26 pages.
U.S. Appl. No. 14/074,787 for Method and System for Configuring Mobile Devices via NFC Technology, filed Nov. 8, 2013 (Smith et al.); 28 pages.
U.S. Appl. No. 14/087,190 for Optimal Range Indicators for Bar Code Validation, filed Nov. 22, 2013 (Hejl); 27 pages.
U.S. Appl. No. 14/345,735 for Optical Indicia Reading Terminal with Combined Illumination filed Mar. 19, 2014 (Ouyang); 19 pages.
U.S. Appl. No. 14/101,965 for High Dynamic-Range Indicia Reading System, filed Dec. 10, 2013 (Xian); 28 pages.
U.S. Appl. No. 14/118,400 for Indicia Decoding Device with Security Lock, filed Nov. 18, 2013 (Liu); 28 pages.
U.S. Appl. No. 14/150,393 for Incicia-reader Having Unitary Construction Scanner, filed Jan. 8, 2014 (Colavito et al.); 28 pages.
U.S. Appl. No. 14/154,207 for Laser Barcode Scanner, filed Jan. 14, 2014 (Hou et al.); 26 pages.
U.S. Appl. No. 14/154,915 for Laser Scanning Module Employing a Laser Scanning Assembly having Elastomeric Wheel Hinges, filed Jan. 14, 2014 (Havens et al.); 24 pages.
U.S. Appl. No. 14/158,126 for Methods and Apparatus to Change a Feature Set on Data Collection Devices, filed Jan. 17, 2014 (Berthiaume et al.); 53 pages.
U.S. Appl. No. 14/342,551 for Terminal Having Image Data Format Conversion filed Mar. 4, 2014 (Lui et al.); 25 pages.
U.S. Appl. No. 14/342,544 for Imaging Based Barcode Scanner Engine with Multiple Elements Supported on a Common Printed Circuit Board filed Mar. 4, 2014 (Liu et al.); 27 pages.
U.S. Appl. No. 14/257,174 for Reading Apparatus Having Partial Frame Operating Mode filed Apr. 21, 2014, (Barber et al.), 67 pages.
U.S. Appl. No. 14/200,405 for Indicia Reader for Size-Limited Applications filed Mar. 7, 2014 (Feng et al.); 42 pages.
U.S. Appl. No. 14/166,103 for Indicia Reading Terminal Including Optical Filter filed Jan. 28, 2014 (Lu et al.); 29 pages.

U.S. Appl. No. 14/490,989, not yet published, filed Sep. 19, 2014, Intermec IP Corporation, Volume Dimensioning System Calibration Systems and Methods.
Wikipedia, YUV description and definition, downloaded from http://www.wikipeida.org/wiki/YUV on Jun. 29, 2012, 10 pages.
YUV Pixel Format, downloaded from http://www.fource.org/yuv.php on Jun. 29, 2012; 13 pages.
YUV to RGB Conversion, downloaded from http://www.fource.org/fccyvrgb.php on Jun. 29, 2012; 5 pages.
Benos et al., "Semi-Automatic Dimensioning with Imager of a Portable Device," U.S. Appl. No. 61/149,912, filed Feb. 4, 2009 (now expired), 56 pages.
Dimensional Weight—Wikipedia, the Free Encyclopedia, URL=http://en.wikipedia.org/wiki/Dimensional_weight, download date Aug. 1, 2008, 2 pages.
Dimensioning—Wikipedia, the Free Encyclopedia, URL=http://en.wikipedia.org/wiki/Dimensioning, download date Aug. 1, 2008, 1 page.
U.S. Appl. No. 14/795,332, Frankc Laffargue et al., filed Jul. 9, 2015, not published yet, Systems and Methods for Enhancing Dimensioning; 55 pages.
U.S. Appl. No. 14/801,023, Tyler Doornenbal et al., filed Jul. 16, 2015, not published yet, Adjusting Dimensioning Results Using Augmented Reality, 39 pages.
Reisner-Kollmann,Irene; Anton L. Fuhrmann, Werner Purgathofer, Interactive Reconstruction of Industrial Sites Using Parametric Models, May 2010, Proceedings of the 26th Spring Conference of Computer Graphics SCCG "10, 8 pages.
Office Action in counterpart European Application No. 13186043.9 dated Sep. 30, 2015, pp. 1-7 [All references previously cited.].
European Search Report for related Application EP 15190249.1, Dated Mar. 22, 2016, 7 pages.
Great Britain Search Report for related Application on. GB1517843.7, Dated Feb. 23, 2016; 8 pages.
European Search Report in related EP Application No. 15190315.0, Dated Apr. 1, 2016, 7 pages [Commonly owned Reference 2014/0104416 has previously cited].
Second Chinese Office Action in related CN Application No. 2015220810562.2, Dated Mar. 22, 2016, 5 pages. English Translation provided [No references].
Second Chinese Office Action in related CN Application No. 201520810685.6, Dated Mar. 22, 2016, 5 pages, no references.
European Search Report for related EP Application No. 15188440.0, Dated Mar. 8, 2016, 8 pages.
Search Report and Opinion in Related EP Application 15176943.7, Dated Jan. 8, 2016, 8 pages, (US Application 2014/0049635 has been previously cited).
Search Report and Opinion in related GB Application No. 1517112.7, Dated Feb. 19, 2016, 6 Pages (GB2503978 is a commonly owned now abandoned application and not cited above).
Lloyd, Ryan and Scott McCloskey, "Recognition of 3D Package Shapes for Singe Camera Metrology" IEEE Winter Conference on Applications of computer Visiona, IEEE, Mar. 24, 2014, pp. 99-106, {retrieved on Jun. 16, 2014}, Authors are employees of common Applicant.
European Search Report for Related EP Application No. 15189214.8, dated Mar. 3, 2016, 9 pages.
James Chamberlin, "System and Method for Picking Validation", U.S Appl. No. 14/865,797, filed Sep. 25, 2015, 44 pages, not yet published.
McCloskey et al., "Image Transformation for Indicia Reading," U.S. Appl. No. 14/982,032, filed Oct. 30, 2015, 48 pages, not yet published.
United Kingdom Search Report in related application GB1517842.9, dated Apr. 8, 2016, 8 pages.
Second Chinese Office Action in related CN Application No. 201520810313.3, Dated Mar. 22, 2016, 5 pages. English Translation provided [No references].
European extended Search report in related EP Application 13785171.3, dated Sep. 19, 2016, 8 pages.
El-Hakim et al., "Multicamera vision-based approach to flexible feature measurement for inspection and reverse engineering", pub-

(56) References Cited

OTHER PUBLICATIONS lished in Optical Engineering, Society of Photo-Optical Instrumentation Engineers, vol. 32, No. 9, Sep. 1, 1993, 15 pages.
El-Hakim et al., "A Knowledge-based Edge/Object Measurement Technique", Retrieved from the Internet: URL: https://www.researchgate.net/profile/Sabry_E1-Hakim/publication/44075058_A_Knowledge_Based_EdgeObject_Measurement_Technique/links/00b4953b5faa7d3304000000.pdf [retrieved on Jul. 15, 2016] dated Jan. 1, 1993, 9 pages.
European Extended search report in related EP Application No. 15190306.9, Dated Sep. 9, 2016, 15 pages [only new references are cited; remaining references were cited with partial search report in same application dated May 6, 2016].
Collings et al., "The Applications and Technology of Phase-Only Liquid Crystal on Silicon Devices", Journal of Display Technology, IEEE Service Center, New, York, NY, US, vol. 7, No. 3, Mar. 1, 2011 (Mar. 1, 2011), pp. 112-119.
European Search Report from related EP Application No. 16168216.6, Dated Oct. 20, 2016, 8 pages [New reference cited above; U.S. Publication 2014/0104413 has been previously cited].
European Extended Search Report in Related EP Application No. 16172995.9, Dated Aug. 22, 2016, 11 pages (Only new references have been cited; U.S. Pat. No. 8,463,079 (formerly U.S. Publication 2010/0220894) and U.S. Publication 2001/0027955 have been previously cited.).
M.Zahid Gurbuz, Selim Akyokus, Ibrahim Emiroglu, Aysun Guran, An Efficient Algorithm for 3D Rectangular Box Packing, 2009, Applied Automatic Systems: Proceedings of Selected AAS 2009 Papers, pp. 131-134 [Examiner cited art in related US matter with Notice of Allowance dated Aug. 11, 2016].
United Kingdom combined Search and Examination Report in related GB Application No. 1607394.2, Dated Oct. 19, 2016, 7 pages.
U.S. Appl. No. 14/800,757 , Eric Todeschini, filed Jul. 16, 2015, not published yet, Dimensioning and Imaging Items, 80 pages.
Proesmans, Marc et al. "Active Acquisition of 3D Shape for Moving Objects" 0-7803-3258-X/96 1996 IEEE; 4 pages.
U.S. Appl. No. 14/747,197, Serge Thuries et al., filed Jun. 23, 2015, not published yet, Optical Pattern Projector; 33 pages.
U.S. Appl. No. 14/747,490, Brian L. Jovanovski et al., filed Jun. 23, 2015, not published yet, Dual-Projector Three-Dimensional Scanner; 40 pages.
U.S. Appl. No. 14/715,916, H. Sprague Ackley, filed May 19, 2015, not published yet, Evaluating Image Values; 54 pages.
U.S. Appl. No. 14/793,149, H. Sprague Ackley, filed Jul. 7, 2015, not published yet, Mobile Dimensioner Apparatus for Use in Commerce; 57 pages.
U.S. Appl. No. 14/740,373, H. Sprague Ackley et al., filed Jun. 16, 2015, not published yet, Calibrating a Volume Dimensioner; 63 pages.
U.S. Appl. No. 14/801,023, Tyler Doomenbal et al., filed Jul. 16, 2015, not published yet, Adjusting Dimensioning Results Using Augmented Reality, 39 pages.
Leotta, Matthew, Generic, Deformable Models for 3-D Vehicle Surveillance, May 2010, Doctoral Dissertation, Brown University, Providence RI, 248 pages.
Ward, Benjamin, Interactive 3D Reconstruction from Video, Aug. 2012, Doctoral Thesis, Univesity of Adelaide, Adelaide, South Australia, 157 pages.
Hood, Frederick W.; William A. Hoff, Robert King, Evaluation of an Interactive Technique for Creating Site Models from Range Data, Apr. 27-May 1, 1997 Proceedings of the ANS 7th Topical Meeting on Robotics & Remote Systems, Augusta GA, 9 pages.
Gupta, Alok; Range Image Segmentation for 3-D Objects Recognition, May 1988, Technical Reports (CIS), Paper 736, University of Pennsylvania Department of Computer and Information Science, retrieved from Http://repository.upenn.edu/cis_reports/736, Accessed May 31, 2015, 157 pages.
Reisner-Kollmann, Irene; Anton L. Fuhrmann, Werner Purgathofer, Interactive Reconstruction of Industrial Sites Using Parametric Models, May 2010, Proceedings of the 26th Spring Conference of Computer Graphics SCCG "10, 8 pages.
Drummond, Tom; Roberto Cipolla, Real-Time Visual Tracking of Complex Structures, Jul. 2002, IEEE Transactions on Pattern Analysis and Machine Intelligence, vol. 24, No. 7; 15 pages.
Zhang, Zhaoxiang; Tieniu Tan, Kaiqi Huang, Yunhong Wang; Three-Dimensional Deformable-Model-based Localization and Recognition of Road Vehicles; IEEE Transactions on Image Processing, vol. 21, No. 1, Jan. 2012, 13 pages.
Leotta, Matthew J.; Joseph L. Mundy; Predicting High Resolution Image Edges with a Generic, Adaptive, 3-D Vehicle Model; IEEE Conference on Computer Vision and Pattern Recognition, 2009; 8 pages.
Spiller, Jonathan; Object Localization Using Deformable Templates, Master's Dissertation, University of the Witwatersrand, Johannesburg, South Africa, 2007; 74 pages.
EP Search and Written Opinion Report in related matter EP Application No. 14181437.6, Dated Mar. 26, 2015, 7 pages.
Hetzel, Gunter et al.; "3D Object Recognition from Range Images using Local Feature Histograms,", Proceedings 2001 IEEE Conference on Computer Vision and Pattern Recognition. CVPR 2001. Kauai, Hawaii, Dec. 8-14, 2001; pp. 394-399, XP010584149, ISBN: 978-0-7695-1272-3.
Intention to Grant in counterpart European Application No. 14157971.4 dated Apr. 14, 2015, pp. 1-8.
Decision to Grant in counterpart European Application No. 14157971.4 dated Aug. 6, 2015, pp. 1-2.
Salvi, Joaquim et al. "Pattern Codification Strategies in Structured Light Systems" published in Pattern Recognition; The Journal of the Pattern Recognition Society, Received Mar. 6, 2003; Accepted Oct. 2, 2003; 23 pages.
Office Action in counterpart European Application No. 13186043.9 dated Sep. 30, 2015, pp. 1-7.
Lloyd et al., "System for Monitoring the Condition of Packages Throughout Transit", U.S. Appl. No. 14/865,575, filed Sep. 25, 2015, 59 pages, not yet published.
James Chamberlin, "System and Method for Picking Validation", U.S. Appl. No. 14/865,797, filed Sep. 25, 2015, 44 pages, not yet published.
Jovanovski et al., "Image-Stitching for Dimensioning", U.S. Appl. No. 14/870,488, filed Sep. 30, 2015, 45 pages, not yet published.
Todeschini et al.; "Depth Sensor Based Auto-Focus System for an Indicia Scanner," U.S. Appl. No. 14/872,176, filed Oct. 1, 2015, 44 pages, not yet published.
Wikipedia, "3D projection" Downloaded on Nov. 25, 2015 from www.wikipedia.com, 4 pages.
McCloskey et al., "Methods for Improving the Accuracy of Dimensioning-System Measurements," U.S. Appl. No. 14/873,613, filed Sep. 2, 2015, 47 pages, not yet published.
Search Report in counterpart European Application No. 15182675.7, Dated Dec. 4, 2015, 10 pages.
McCloskey et al., "Image Transformation for Indicia Reading," U.S. Appl. No. 14/928,032, filed Oct. 30, 2015, 48 pages, not yet published.
Great Britain Combined Search and Examination Report in related Application GB1517842.9, Dated Apr. 8, 2016, 8 pages [References previously cited].
European Extended Search Report in related EP Application No. 16173429.8, dated Dec. 1, 2016, 8 pages [Only new references cited: US 2013/0038881 was previously cited].
Extended European Search Report in related EP Application No. 16175410.0, dated Dec. 13, 2016, 5 pages.
European Extended Search Report in related EP Application No. 16190017.0, dated Jan. 4, 2017, 6 pages.
Padzensky, Ron; "Augmera; Gesture Control", Dated Apr. 18, 2015, 15 pages [Examiner Cited Art in Office Action dated Jan. 20, 2017 in related Application.].
Grabowski, Ralph; "New Commands in AutoCADS 2010: Part 11 Smoothing 3D Mesh Objects" Dated 2011 (per examiner who cited reference), 6 pages, [Examiner Cited Art in Office Action dated Jan. 20, 2017 in related Application.].

(56) References Cited

OTHER PUBLICATIONS

Theodoropoulos, Gabriel; "Using Gesture Recognizers to Handle Pinch, Rotate, Pan, Swipe, and Tap Gestures" dated Aug. 25, 2014, 34 pages, [Examiner Cited Art in Office Action dated Jan. 20, 2017 in related Application.].
Wikipedia, "Microlens", Downloaded from https://en.wikipedia.org/wiki/Microlens, pp. 3. {Cited by Examiner in Feb. 9, 2017 Final Office Action in related matter}.
Fukaya et al., "Characteristics of Speckle Random Pattern and Its Applications", pp. 317-327, Nouv. Rev. Optique, t.6, n.6. (1975) {Cited by Examiner in Feb. 9, 2017 Final Office Action in related matter: downloaded Mar. 2, 2017 from http://iopscience.iop.org}.
European Examination report in related EP Application No. 14181437.6, dated Feb. 8, 2017, 5 pages [References have been previously cited].
European Partial Search Report for related EP Application No. 15190306.9, dated May 6, 2016, 8 pages.
Mike Stensvold, "get the Most Out of Variable Aperture Lenses", published on www.OutdoorPhotogrpaher.com; dated Dec. 7, 2010; 4 pages, [As noted on search report retrieved from URL: http://www.outdoorphotographer.com/gear/lenses/get-the-most-out-ofvariable-aperture-lenses.html on Feb. 9, 2016].
European Search Report for related EP Application No. 16152477.2, dated May 24, 2016, 8 pages [New Reference cited herein; Reference DE102007037282 A1 and its US Counterparts have been previously cited].
European extended search report in related EP Application 16190833.0, dated Mar. 9, 2017, 8 pages. [only new art has been cited; US Publication 2014/0034731 was previously cited].
United Kingdom Combined Search and Examination Report in related Application No. GB1620676.5, dated Mar. 8, 2017, 6 pages. [References have been previously cited; WO2014/151746, WO2012/175731, US 2014/0313527, GB2503978].
European Exam Report in related , EP Application No. 16168216.6, dated Feb. 27, 2017, 5 pages, [References have been previously cited; WO2011/017241 and US 2014/0104413].
Chinese Notice of Reexamination in related Chinese Application 201520810313.3, dated Mar. 14, 2017, English computer Translation provided, 7 pages [No new art cited].
Extended European search report in related EP Application 16199707.7, dated Apr. 10, 2017, 15 pages.
Ulusoy et al., One-Shot Scanning using De Bruijn Spaced Grids, 2009 IEEE 12th International Conference on Computer Vision Workshops, ICCV Workshops, 7 pages [Cited in EP Extended search report dated Apr. 10, 2017].
Thorlabs Optics, Examiner Cited NPL in Advisory Action dated Apr. 12, 2017 in related commonly owned application, download from https://www.thorlabs.com/newgrouppage9.cfm?objectgroup_id=6430, 4 pages.
Eksma Optics, Examiner Cited NPL in Advisory Action dated Apr. 12, 2017 in related commonly owned application, downloaded from http://eksmaoptics.com/optical-systems/f-theta-lenses/f-theta-lens-for-1064-nm/, 2 pages.
Sill Optics, Examiner Cited NPL in Advisory Action dated Apr. 12, 2017 in related commonly owned application, http://www.silloptics.de/1/products/sill-encyclopedia/laser-optics/f-theta-lenses/, 4 pages.
European Exam Report in related EP Application No. 15176943.7, dated Apr. 12, 2017, 6 pages [Art previously cited in this matter].
European Exam Report in related EP Application No. 15188440.0, dated Apr. 21, 2017, 4 pages [No new art to cite].
Ralph Grabowski, "Smothing 3D Mesh Objects,"New Commands in AutoCAD 2010: Part 11, Examiner Cited art in related matter Non Final Office Action dated May 19, 2017; 6 pages.
European Exam Report in related EP Application No. 16152477.2, dated Jun. 20, 2017, 4 pages [No art to be cited].
Boavida et al., "Dam monitoring using combined terrestrial imaging systems", 2009 Civil Engineering Survey De/Jan. 2009, pp. 33-38 {Cited in Notice of Allowance dated Sep. 15, 2017 in related matter}.
EP Search Report in related EP Application No. 17171844 dated Sep. 18, 2017. 4 pages [Only new art cited herein}.
European Exam Report in related EP Applciation 16172995.9, dated Jul. 6, 2017, 9 pages [No new art to be cited].
United Kingdom Search Report in related Application No. GB1700338.5, dated Jun. 30, 2017, 5 pages.
European Search Report in related EP Application No. 17175357.7, dated Aug. 17, 2017, pp. 1-7 [No new art to be cited].

\* cited by examiner

DIMENSIONING SYSTEM

CROSS-REFERENCE TO PRIORITY APPLICATION

This application hereby claims the benefit of U.S. Provisional Patent Application No. 61/714,394 for an "Integrated Dimensioning and Weighing System" (filed Oct. 16, 2012 at the United States Patent and Trademark Office), which is hereby incorporated by reference in its entirety.

FIELD OF THE INVENTION

The present invention relates to the field of devices for weighing and dimensioning packages, more specifically, to an integrated dimensioning and weighing system for packages.

BACKGROUND

Shipping companies typically charge customers for their services based on package size (i.e., volumetric weight) and/or weight (i.e., dead weight). When printing a shipping label for a package to be shipped, a customer enters both the size and weight of the package into a software application that bills the customer based on the information. Typically, customers get this information by hand-measuring package's dimensions (e.g., with a tape measure) and may weigh the package on a scale. In some cases, customers simply guess the weight of the package. Both guessing of the weight and hand-measurement of dimensions are prone to error, particularly when packages have irregular shape. When the shipping company determines, at a later time, that the package is larger and/or heavier than reported by the customer, an additional bill may be issued to the customer. Additional bills may reduce customer satisfaction, and, if the shipping customer is a retail company who has already passed along the shipping cost to an end customer, decrease the customer's earnings.

Furthermore, shipping companies may also collect the package's origin, destination, and linear dimensions from a customer to determine the correct charges for shipping a package. Manual entry of this information by a customer or the shipping company is also error prone.

As such, there is a commercial need for systems that accurately collect a package's size, weight, linear dimensions, origin, and destination and for integration with billing systems to reduce errors in transcribing that data.

SUMMARY

Accordingly, in one aspect, the present invention embraces an object analysis system. The system includes a scale for measuring the weight of the object, a range camera configured to produce a range image of an area in which the object is located, and a computing device configured to determine the dimensions of the object based, at least in part, on the range image.

In an exemplary embodiment, the range camera is configured to produce a visible image of the scale's measured weight of the object and the computing device is configured to determine the weight of the object based, at least in part, on the visible image. The scale may be an analog scale having a gauge and the visible image produced by the range camera includes the scale's gauge. Alternatively, the scale may be a digital scale having a display and the visible image produced by the range camera includes the scale's display.

In yet another exemplary embodiment, the computing device is configured to execute shipment billing software.

In yet another exemplary embodiment, the object analysis system transmits the weight of the object and determined dimensions to a host platform configured to execute shipment billing software.

In yet another exemplary embodiment, the object analysis system includes a microphone for capturing audio from a user and the computing device is configured for converting the captured audio to text.

In yet another exemplary embodiment, the range camera is configured to project a visible laser pattern onto the object and produce a visible image of the object and the computing device is configured to determine the dimensions of the object based, at least in part, on the visible image of the object.

In yet another exemplary embodiment, the scale and the range camera are fixed in position and orientation relative to each other and the computing device is configured to determine the dimensions of the object based, at least in part, on ground plane data of the area in which the object is located. The ground plane data may be generated by capturing an initial range image and identifying a planar region in the initial range image that corresponds to a ground plane.

In another aspect, the present invention embraces a method for determining the dimensions of an object that includes capturing a range image of a scene that includes the object and determining the dimensions of the object based, at least in part, on the range image and ground plane data of the area in which the object is located.

In yet another aspect, the present invention embraces a terminal for measuring at least one dimension of an object that includes a range camera, a visible camera, a display that are fixed in position and orientation relative to each other. The range camera is configured to produce a range image of an area in which the object is located. The visible camera is configured to produce a visible image of an area in which the object is located. The display is configured to present information associated with the range camera's field of view and the visible camera's field of view.

In an exemplary embodiment, the range camera's field of view is narrower than the visible camera's field of view and the display is configured to present the visible image produced by the visible camera and an outlined shape on the displayed visible image corresponding to the range camera's field of view.

In another exemplary embodiment, the display is configured to present the visible image produced by the visible camera and a symbol on the displayed visible image corresponding to the optical center of the range camera's field of view.

In yet another aspect, the present invention embraces a method for determining the dimensions of an object that includes projecting a laser pattern (e.g., a visible laser pattern) onto the object, capturing an image of the projected pattern on the object, and determining the dimensions of the objection based, at least in part, on the captured image.

The foregoing illustrative summary, as well as other exemplary objectives and/or advantages of the invention, and the manner in which the same are accomplished, are further explained within the following detailed description and its accompanying drawings.

DETAILED DESCRIPTION

The present invention embraces a system that accurately collects a package's size, weight, linear dimensions, origin, and destination and that may be integrated with billing systems to reduce errors in transcribing that data.

Figure 1:
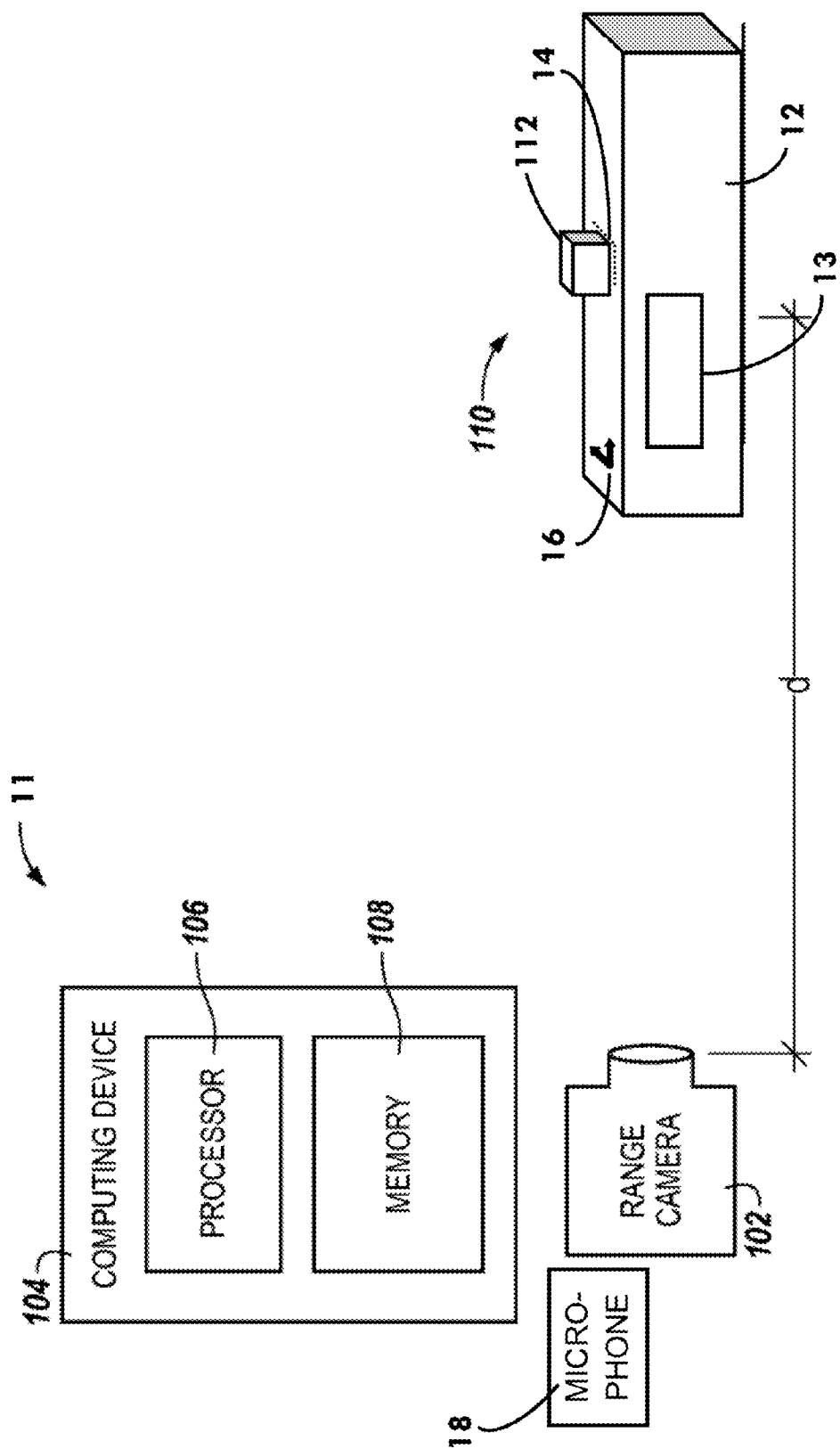
FIG. 1 illustrates an object analysis system in accordance with one or more exemplary embodiments.

In one aspect, the present invention embraces an object analysis system. FIG. 1 illustrates an exemplary object analysis system 11. As depicted, the system 11 includes a scale 12, a range camera 102, a computing device 104, and a microphone 18. Typically, the scale 12 measures the weight of the object 112, the range camera 102 is configured to produce a range image of an area 110 in which the object is located, and the computing device 104 is configured to determine the dimensions of the object 112 based, at least in part, on the range image.

As noted, the scale 12 measures the weight of the object 112. Exemplary scales 12 include analog scales having gauges or and digital scales having displays. The scale 12 of FIG. 1 includes a window 13 for showing the measured weight of the object 112. The window 13 may be a gauge or display depending on the type of scale 12.

The scale 12 also includes top surface markings 14 to guide a user to place the object in a preferred orientation for analysis by the system. For example, a particular orientation may improve the range image and/or visible image produced by range camera 102. Additionally, the scale may include top surface markings 16 to facilitate the computing device's estimation of a reference plane during the process of determining the dimensions of the object 112.

In exemplary embodiments, the scale 12 transmits the measured weight of the object 112 to the computing device 104 and/or a host platform 17. In this regard, the scale 12 may transmit this information via a wireless connection and/or a wired connection (e.g., a USB connection, such as a USB 1.0, 2.0, and/or 3.0).

As noted, the object analysis system 11 includes a range camera 102 that is configured to produce a range image of an area 110 in which the object 112 is located. In exemplary embodiments, the range camera 102 is also configured to produce a visible image of the scale's measured weight of the object 112 (e.g., a visible image that includes window 13). The range camera 102 may be separate from the computing device 104, or the range camera 102 and the computing device 104 may be part of the same device. The range camera 102 is typically communicatively connected to the computing device 104.

The depicted object analysis system 11 includes a microphone 18. The microphone 18 may be separate from the range camera 102, or the microphone 18 and the range camera 102 may be part of the same device. Similarly, the microphone 18 may be separate from the computing device 104, or the microphone 18 and the computing device 104 may be part of the same device.

The microphone 18 captures audio from a user of the object analysis system 11, which may then be converted to text (e.g., ASCII text). In exemplary embodiments, the text may be presented to the user via a user-interface for validation or correction (e.g., by displaying the text on a monitor or by having a computerized reader speak the words back to the user). The text is typically used as an input for software (e.g., billing software and/or dimensioning software). For example, the text (i.e., as generated by converting audio from the user) may be an address, in which case the computing device may be configured to determine the components of the address. In this regard, exemplary object analysis systems reduce the need for error-prone manual entry of data.

Additionally, the text may be used as a command to direct software (e.g., billing software and/or dimensioning software). For example, if multiple objects are detected in the range camera's field of view, a user interface may indicate a numbering for each object and ask the user which package should be dimensioned. The user could then give a verbal command by saying a number, and the audio as captured by the microphone 18 can be converted into text which commands the dimensioning software. Similarly, the user could give verbal commands to describe the general class of the object (e.g., "measure a box") or to indicate the type of information being provided (e.g., a command of "destination address" to indicate that an address will be provided next).

The computing device 104 may be configured for converting the audio captured by the microphone 18 to text. Additionally, the computing device 104 may be configured to transmit the captured audio (e.g., as a file or a live stream) to a speech-to-text module and receive the text. The captured audio may be transcoded as necessary by the computing device 104. The computing device 104 may or may not include the speech-to-text module. For example, the computing device 104 may transmit (e.g., via a network connection) the captured audio to an external speech-to-text service provider (e.g., Google's cloud-based speech-to-text service). In exemplary embodiments, the speech-to-text module transmits the text and a confidence measure of each converted phrase. The computing device 104 may be configured to enter the text into shipment billing software (e.g., by transmitting the text to a host platform 17 configured to execute shipment billing software).

As noted, the object analysis system 11 includes a computing device 104. The computing device 104 depicted in FIG. 1 includes a processor 106 and a memory 108. Additional aspects of processor 106 and memory 108 are discussed with respect to FIG. 2. Memory 108 can store executable instructions, such as, for example, computer readable instructions (e.g., software), that can be executed by processor 106. Although not illustrated in FIG. 1, memory 108 can be coupled to processor 106.

The computing device 104 is configured to determine the dimensions of an object 112 based, at least in part, on a range image produced by range camera 102. Exemplary methods of determining the dimensions of an object 112 are discussed with respect to FIGS. 2-16. The computing device 104 may also be configured to determine the weight of an object 112 based, at least in part, on a visible image produced by range camera 102. For example, the computing device 104 may execute software that processes the visible image to read the weight measured by the scale 12.

The computing device 104 may be configured to calculate the density of the object 112 based on its determined dimensions and weight. Furthermore, the computing device 104 may be configured to compare the calculated density to a realistic density threshold (e.g., as preprogrammed data or tables). If the calculated density exceeds a given realistic density threshold, the computing device 104 may: re-determine the dimensions of the object 112 based on the range image; instruct the range camera 102 to produce a new range image; instruct the range camera 102 to produce a new visible image and/or instruct the scale 12 to re-measure the object 112.

The computing device 104 may also be configured to compare the determined dimensions of the object 112 with the dimensions of the scale 12. In this regard, the scale's dimensions may be known (e.g., as preprogrammed data or tables), and the computing device 104 may be configured to determine the dimensions of the object based on the range image and the known dimensions of the scale 12. Again, if the determined dimensions exceed a given threshold of comparison, the computing device 104 may: re-determine the dimensions of the object 112 based on the range image; instruct the range camera 102 to produce a new range image; instruct the range camera 102 to produce a new visible image and/or instruct the scale 12 to re-measure the object 112.

In exemplary embodiments, the computing device 104 may be configured to execute shipment billing software. In such embodiments, the computing device 104 may be a part of the same device as the host platform 17, or the object analysis system 11 may not include a host platform 17.

Alternatively, the object analysis system 11 may transmit (e.g., via a wireless connection and/or a wired connection, such as a USB connection) the weight of the object 112 and determined dimensions to a host platform 17 configured to execute shipment billing software. For example, the computing device 104 may transmit the weight of the object 112 and determined dimensions to the host platform 17.

In exemplary embodiments, the range camera 102 is configured to project a laser pattern (e.g., a visible laser pattern) onto the object 112 and produce a visible image of the object 112, and the computing device 104 is configured to determine the dimensions of the object 112 based, at least in part, on the visible image of the object 112. In this regard, the projection of the laser pattern on the object 112 provides additional information or an alternative or supplemental method for determining the dimensions of the object 112. Furthermore, the laser pattern will facilitate user-placement of the object with respect to the range camera.

An exemplary object analysis system 11 includes a scale 12 and a range camera 102 that are fixed in position and orientation relative to each other. The computing device 104 of such an exemplary object analysis system 11 may be configured to determine the dimensions of the object 112 based, at least in part, on ground plane data of the area 110 in which the object is located. The ground plane data may include data generated by capturing an initial range image and identifying a planar region in the initial range image that corresponds to a ground plane.

The ground plane data may be stored on the computing device 104 during manufacturing after calibrating the object analysis system 11. The ground plane data may also be updated by the computing device 104 after installation of the object analysis system 11 or periodically during use by capturing an initial range image and identifying a planar region in the initial range image that corresponds to a ground plane.

The computing device 104 may be configured to verify the validity of the ground plane data by identifying a planar region in the range image produced by the range camera 102 that corresponds to a ground plane. If the ground plane data does not correspond to the identified planar region in the range image, the computing device 104 may update the ground plane data.

In exemplary embodiments, the computing device 104 may be configured to control the object analysis system in accordance with multiple modes. While in a detection mode, the computing device 104 may be configured to evaluate image viability and/or quality (e.g., of an infra-red image or visible image) in response to movement or the placement of an object in the range camera's field of view. Based on the evaluation of the image viability and/or quality, the computing device 104 may be configured to place the object analysis system in another mode, such as an image capture mode for capturing an image using the range camera 102 or an adjust mode for adjusting the position of the range camera 102.

In exemplary embodiments, the object analysis system may include positioning devices, (e.g., servo motors, tilt motors, and/or three-axis accelerometers) to change the position of the range camera relative to the object. In this regard, the computing device 104 may be configured to control and receive signals from the positioning devices. After evaluating image viability and/or quality, the computing device may place the object analysis system in an adjust mode. The computing device may be configured to have two adjust modes, semiautomatic and automatic. In semiautomatic adjust mode, the computing device may be configured to provide visual or audio feedback to an operator that then moves the range camera (e.g., adjusts the camera's tilt angle and/or height). In automatic mode, the computing device may be configured to control and receive signals from the positioning devices to adjust the position of the range camera. By adjusting the position of the range camera, the object analysis system can achieve higher dimensioning accuracy.

In another aspect, the present invention embraces a method for determining the dimensions of an object. The method includes capturing an image of a scene that includes the object and determining the dimensions of the object based, at least in part, on the range image and ground plane data of the area in which the object is located. As noted with respect to an exemplary object analysis system, the ground plane data may include data generated by capturing an initial range image and identifying a planar region in the initial range image that corresponds to a ground plane. The method may also include verifying the validity of the ground plane data by identifying a planar region in the range image that corresponds to a ground plane.

This exemplary method for determining the dimensions of an object is typically used in conjunction with a range camera on a fixed mount at a given distance and orientation with respect to the area in which the object is placed for dimensioning. In this regard, utilizing the ground plane data, rather than identifying the ground plane for each implementation of the method, can reduce the time and resources required to determine the dimensions of the object.

In yet another aspect, the present invention embraces another method for determining the dimensions of an object. The method includes projecting a laser pattern (e.g., a visible laser pattern) onto an object, capturing an image of the projected pattern on the object, and determining the dimensions of the object based, at least in part, on the captured image. In an exemplary embodiment, the object has a rectangular box shape.

An exemplary method includes projecting a laser pattern (e.g., a grid or a set of lines) onto a rectangular box. Typically, the box is positioned such that two non-parallel faces are visible to the system or device projecting the laser pattern and a camera system with known field of view characteristics. The camera system is used to capture an image of the laser light reflecting off of the box. Using image analysis techniques (e.g., imaging software), the edges of the box are determined. The relative size and orientation of the faces is determined by comparing the distance between lines of the laser pattern in the captured image to the known distance between the lines of the laser pattern as projected while considering the characteristics of the camera system's field of view, such as size, aspect ratio, distortion, and/or angular magnification.

The distance from the camera system to the box may also be desired and may be used to determine the dimensions of the box. The distance between the camera system and the box can be determined using a variety of methods. For example, the distance from the camera system to the box may be determined from the laser pattern and the camera system's field of view. Additionally, sonar ranging techniques or considering the light time of flight may facilitate determination of this distance.

Another exemplary method includes projecting a laser pattern including two horizontal, parallel lines and two vertical, parallel lines. The distance between each set of parallel lines is constant. In this regard, the laser pattern is collimated, producing a constant-size square or rectangle in the center of the laser pattern as it propagates away from the device that generated the laser pattern.

Figure 17:
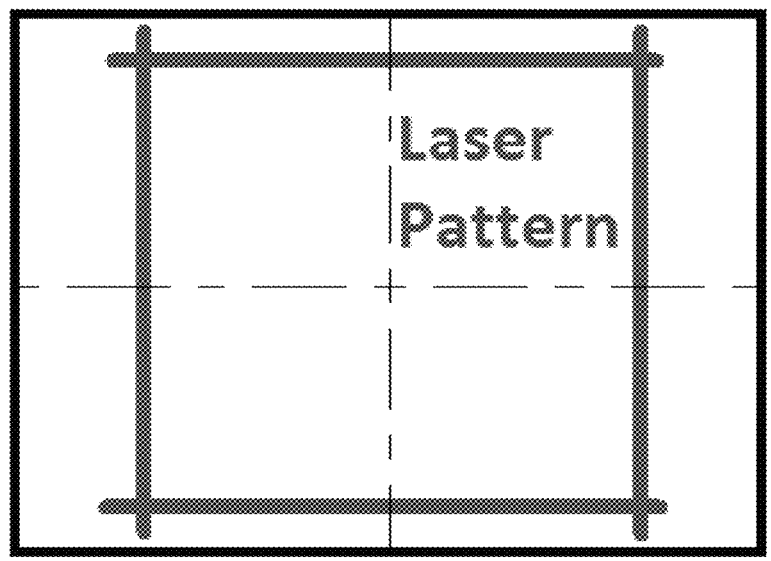
FIG. 17 depicts the near field relationship between a laser pattern and a camera system's field of view as employed in an exemplary method.
Figure 18:
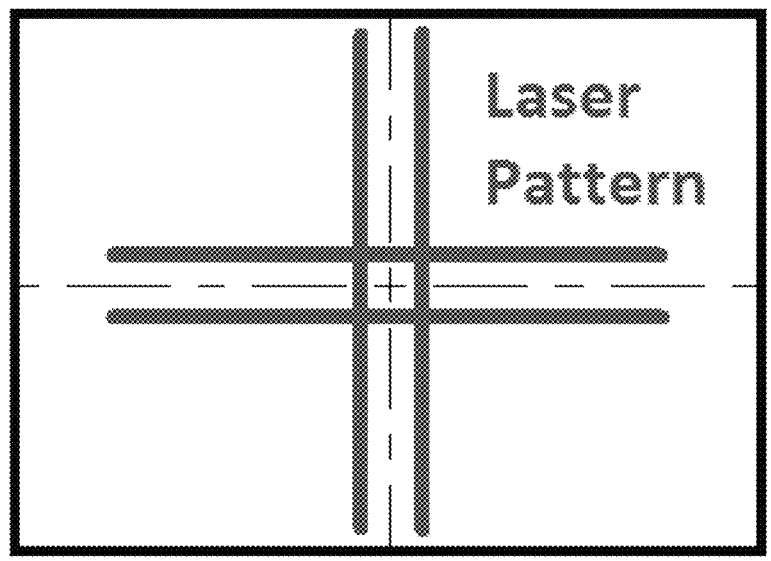
FIG. 18 depicts the far field relationship between a laser pattern and a camera system's field of view as employed in an exemplary method.

An exemplary laser pattern including two horizontal, parallel lines and two vertical, parallel lines is depicted in FIGS. 17 and 18. The exemplary laser pattern is aligned to the field of view of the camera system, and the relationship between the laser pattern and the field of view are determined. This relationship may be determined by a precision alignment of the laser pattern to a known fixture pattern and/or a software calibration process may process two or more images from the camera system. FIG. 17 depicts the approximated relationship between the laser pattern and the camera's near-field field of view, and FIG. 18 depicts the approximated relationship between the laser pattern and the camera's far-field field of view.

The exemplary method typically includes projecting the laser pattern onto two faces of a standard rectilinear box-shaped object such that the two horizontal laser lines are parallel to and on opposite side of the edge connecting the two faces (i.e., one horizontal laser line above the edge and the other horizontal line below the edge). Additionally, the laser pattern is typically projected such that the laser pattern fully traverses the visible faces of the object.

Figure 19:
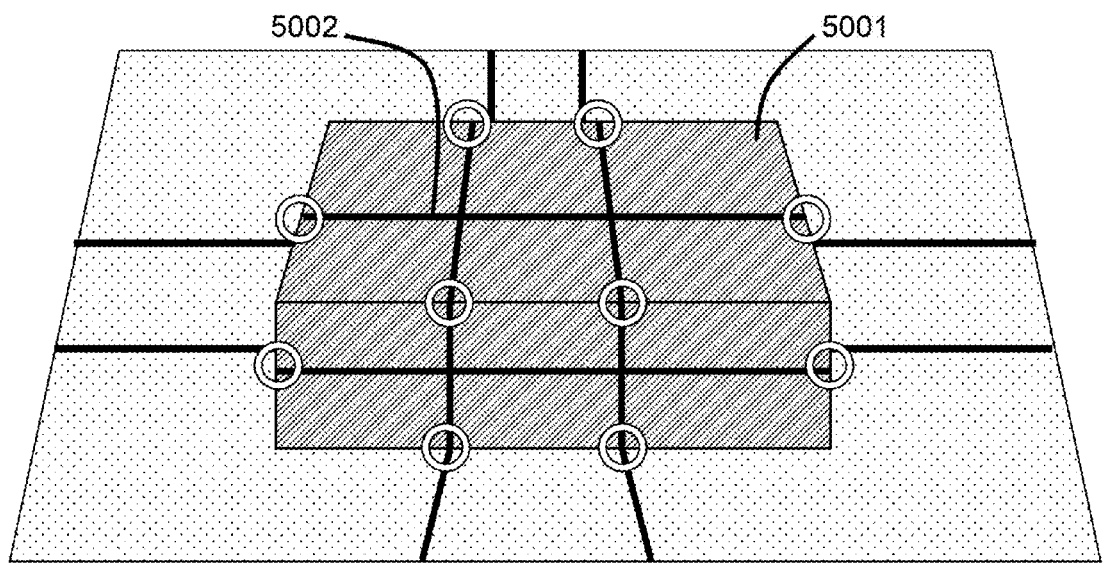
FIG. 19 depicts an exemplary arrangement of a standard rectilinear box-shaped object on a flat surface upon which a laser pattern has been projected in accordance with an exemplary method.

FIG. 19 depicts an exemplary arrangement of a standard rectilinear box-shaped object 5001 upon which a laser pattern 5002 has been projected. As depicted, the two horizontal laser lines are parallel to and on opposite sides of the edge connecting the two faces. Additionally, the laser pattern 5002 fully traverse the visible faces of the object 5001. Accordingly, a number of break points, typically ten break points, are formed in the projected laser pattern 5002. These break points are identified in FIG. 19 by open circles.

The exemplary method includes capturing an image of the projected laser pattern on the object (e.g., with a camera system). The dimensions of the object are then determined, at least in part, from the captured image. For example, a processor may be used to process the image to identify the break points in the projected laser pattern. Using the known relationship between the laser pattern and the field of view, the break points may be translated into coordinates in a three-dimensional space. Typically, any two break points which are connected by a laser line segment can be used to calculate a dimension of the object.

In an exemplary embodiment, the method includes determining the coordinates of the break points in a three-dimensional space based on the known size of the central rectangle (e.g., a square). In other words, the known size of the rectangle is used as a ruler or measuring stick in the image to determine the dimensions of the object.

Exemplary methods include projecting a laser pattern including laser lines having a profile with a small divergence angle. In other words, the width of the laser lines increases as the distance from the device projecting the pattern increases. The divergence angle is typically between about 1 and 30 milliradians (e.g., between about 2 and 20 milliradians). In an exemplary embodiment, the divergence angle is between about 3 and 10 milliradians (e.g., about 6 milliradians).

In exemplary embodiments, the laser lines' divergence angle corresponds to the divergence of a small number of pixels (e.g., between about 2 and 10 pixels) within the camera system used to capture an image. Thus, as the field of view of this small number of pixels expands with increasing distance from the camera system, the width of the laser lines increases at a similar rate. Accordingly, the width of the laser lines covers approximately the same number of pixels, although not necessarily the same set of pixels, regardless of the projected laser pattern's distance from the camera system.

Figure 20:
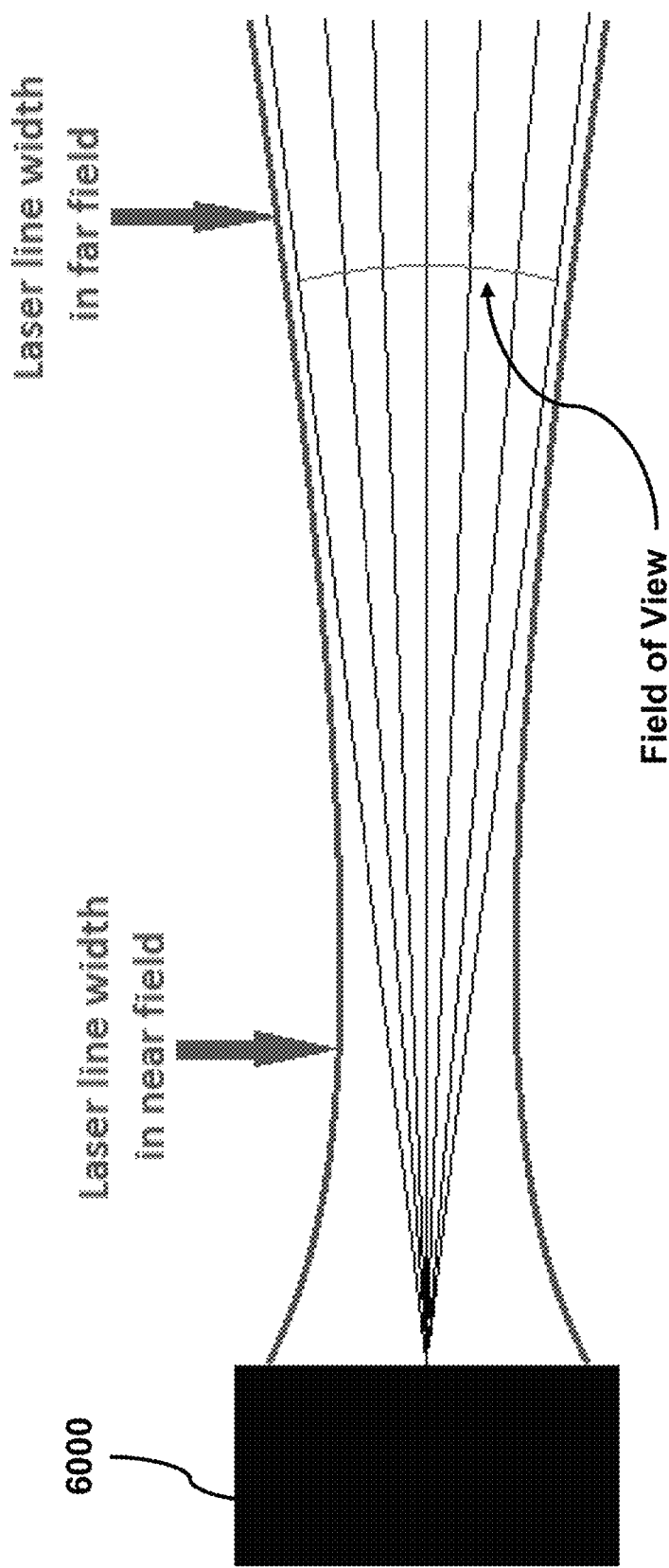
FIG. 20 schematically depicts a relationship between the width of a laser line and the size of the field of view of a small number of pixels within a camera system.

In another exemplary embodiment, the laser pattern includes laser lines having a profile with a divergence angle such that the width of the laser line in the far field corresponds to the field of view of a small number of pixels in the far field. In this regard, the divergence angle of the laser lines does not necessarily match the field of view of the small number of pixels in the near field. FIG. 20 schematically depicts such a relationship between the laser lines' width and the field of view of a small number of pixels within a camera system. The depicted device 6000 includes the camera system and a laser projecting module.

Exemplary methods utilizing a laser pattern that includes laser lines having a profile with a small divergence angle prevents the loss of resolution in the far field. When projected laser lines are conventionally collimated, the laser lines appear increasingly thinner on a target object as the distance between the laser projection module and the target object increases. If the reflected light from a projected laser line falls on an area of the camera system's sensor that is approximately one pixel wide or smaller, the precision of the dimensioning method can be no greater than one pixel. In contrast, when projected laser lines have a profile with a small divergence angle, the projected line has an energy distribution encompassing multiple pixels facilitating a more precise determination of the center of the projected line. Accordingly, methods employing projected laser lines having a profile with a small divergence angle facilitate measurements that exceed the resolution of the camera pixel sampling.

In yet another aspect, the present invention embraces a terminal for measuring at least one dimension of an object. The terminal includes a range camera, a visible camera (e.g., a grayscale and/or RGB sensor), and a display that are fixed in position and orientation relative to each other. The range camera is configured to produce a range image of an area in which an object is located, and the visible camera is configured to produce a visible image of an area in which the object is located. The display is configured to present information associated with the range camera's field of view and the visible camera's field of view.

Typically, the range camera's field of view is narrower than the visible camera's field of view. To facilitate accurate dimensioning, the display is configured to present the visible image produced by the visible camera and an outlined shape on the displayed visible image corresponding to the range camera's field of view (e.g., a rectangle). The outlined shape shows the user of the terminal when the object to be dimensioned is within the range camera's field of view. In other words, the interior of the outlined shape typically corresponds to the intersection or overlap between the visible image and the range image.

In exemplary embodiments, the display is configured to present information associated with the optimal orientation of the range camera and visible camera with respect to the object. Such information further facilitates accurate dimensioning by encouraging the user to adjust the orientation of the terminal to an orientation that accelerates or improves the dimensioning process.

The display may be configured to present the visible image produced by the visible camera and a symbol on the displayed visible image corresponding to the optical center of the range camera's field of view. Again, presenting such a symbol on the display facilitates accurate dimensioning by encouraging the user to adjust the orientation of the terminal to an orientation that accelerates or improves the dimensioning process.

In exemplary embodiments, the symbol shown by the display is a crosshair target having three prongs. When the object is a rectangular box, the display may be configured to show the three prongs of the crosshairs on the displayed visible image in an orientation that corresponds to the optimal orientation of the range camera and visible camera with respect to a corner of the rectangular box.

When the object to be dimensioned is cylindrically shaped (e.g., having a medial axis and base), the display may be configured to show the visible image produced by the visible camera and a line on the displayed visible image in an orientation that corresponds to the optimal orientation of the range camera and visible camera with respect to the medial axis of the object. The display may also be configured to show the visible image produced by the visible camera and an ellipse on the displayed visible image in an orientation that corresponds to the optimal orientation of the range camera and visible camera with respect to the base of the object.

As noted, the configuration of the terminal's display presents information associated with the range camera's field of view and the visible camera's field of view. The information helps the user determine the three degrees of freedom and/or the three degrees of freedom for translation of the camera relative to the object that will ensure or at least facilitate an accurate measurement of the object.

In exemplary embodiments, the terminal may include a processor that is configured to automatically initiate a dimensioning method when the orientation of the terminal with respect to an object corresponds to an orientation that accelerates or improves the dimensioning process. Automatically initiating the dimensioning method in this manner prevents any undesirable motion of the terminal that may be induced when an operator presses a button or other input device on the terminal. Additionally, automatically initiating the dimensioning method typically improves the accuracy of the dimensioning method.

As noted, the terminal's display may be configured to present information associated with the optimal orientation of the range camera and visible camera with respect to the object. The terminal's processor may be configured to analyze the output of the display (i.e., the visible image and the information associated with the optimal orientation) and initiate the dimensioning method (e.g., including capturing a range image) when the orientation information and the visible image align. The terminal's processor may be configured to analyze the output of the display using imaged-based edge detection methods (e.g., a Canny edge detector).

For example, if the orientation information presented by the display is a crosshair target having three prongs, the processor may be configured to analyze the output of the display using edge detection methods and, when the combined edge strengths of the three prongs and three of the object's edges (i.e., at a corner) exceed a threshold, the processor automatically initiates a dimensioning method. In other words, when the three prongs align with the object's edges, the processor automatically initiates a dimensioning method. Typically, the edge detection methods are only applied in the central part of the display's output image (i.e., near the displayed orientation information) to reduce the amount of computation.

In exemplary embodiments, the display is configured to present information associated with the optimal distance of the terminal from the object. Such information further facilitates accurate dimensioning by encouraging the user to position the terminal at a distance from the object that accelerates or improves the dimensioning process. For example, the range camera of the terminal typically has a shorter depth of view than does the visible camera.

Additionally, when objects are very close to the terminal the range camera typically does not work as accurately, but the visible camera functions normally. Thus, when viewing the visible image produced by the visible camera on the display, objects outside of the range camera's optimal range (i.e., either too close or too far from the terminal to accurately determine the object's dimensions) appear normal.

Accordingly, the display may be configured to present the visible image produced by the visible camera modified such that portions of the visible image corresponding to portions of the range image with high values (e.g., distances beyond the range camera's optimal range) are degraded (e.g., a percentage of the pixels corresponding to the range image's high values are converted to a different color, such as white or grey). The amount of degradation (e.g., the percentage of pixels converted) typically corresponds to the range image's value beyond the upper end of the range camera's optimal range. In other words, the amount of degradation occurs such that the clarity of objects in the displayed visible image corresponds to the range camera's ability to determine the object's dimensions. The amount of degradation may begin at a certain low level corresponding to a threshold distance from the terminal, increase linearly up to a maximum distance after which the degradation is such that the visible image is no longer displayed (e.g., only grey or white is depicted).

Similarly, the display may be configured to present the visible image produced by the visible camera modified such that portions of the visible image corresponding to portions of the range image with low values (e.g., distances less than the range camera's optimal range) are degraded (e.g., a percentage of the pixels corresponding to the range image's high values are converted to a different color, such as black or grey). The amount of degradation (e.g., the percentage of pixels converted) may correspond to the range image's value under the lower end of the range camera's optimal range. Typically, the degradation is complete (i.e., only black or grey) if the range image's value is less than the lower end of the range camera's optimal range. Additional aspects of an exemplary terminal and dimensioning method are described herein with respect to FIGS. 4-16.

An exemplary method of determining the dimensions of an object using a range camera is described in U.S. patent application Ser. No. 13/278,559 filed at the U.S. Patent and Trademark Office on Oct. 21, 2011 and titled "Determining Dimensions Associated with an Object," which is hereby incorporated by reference in its entirety.

In this regard, devices, methods, and systems for determining dimensions associated with an object are described herein. For example, one or more embodiments include a range camera configured to produce a range image of an area in which the object is located, and a computing device configured to determine the dimensions of the object based, at least in part, on the range image.

One or more embodiments of the present disclosure can increase the automation involved in determining the dimensions associated with (e.g., of) an object (e.g., a box or package to be shipped by a shipping company). For example, one or more embodiments of the present disclosure may not involve an employee of the shipping company physically contacting the object during measurement (e.g., may not involve the employee manually measuring the object and/or manually entering the measurements into a computing system) to determine its dimensions. Accordingly, one or more embodiments of the present disclosure can decrease and/or eliminate the involvement of an employee of the shipping company in determining the dimensions of the object. This can, for example, increase the productivity of the employee, decrease the amount of time involved in determining the object's dimensions, reduce and/or eliminate errors in determining the object's dimensions (e.g., increase the accuracy of the determined dimensions), and/or enable a customer to check in and/or pay for a package's shipping at an automated station (e.g., without the help of an employee), among other benefits.

In the following description, reference is made to FIGS. 2 and 3 that form a part hereof. The drawings show by way of illustration how one or more embodiments of the disclosure may be practiced. These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in FIGS. 2 and 3 are intended to illustrate the embodiments of the present disclosure, and should not be taken in a limiting sense. As used in the disclosure of this exemplary dimensioning method, "a" or "a number of" something can refer to one or more such things. For example, "a number of planar regions" can refer to one or more planar regions.

Figure 2:
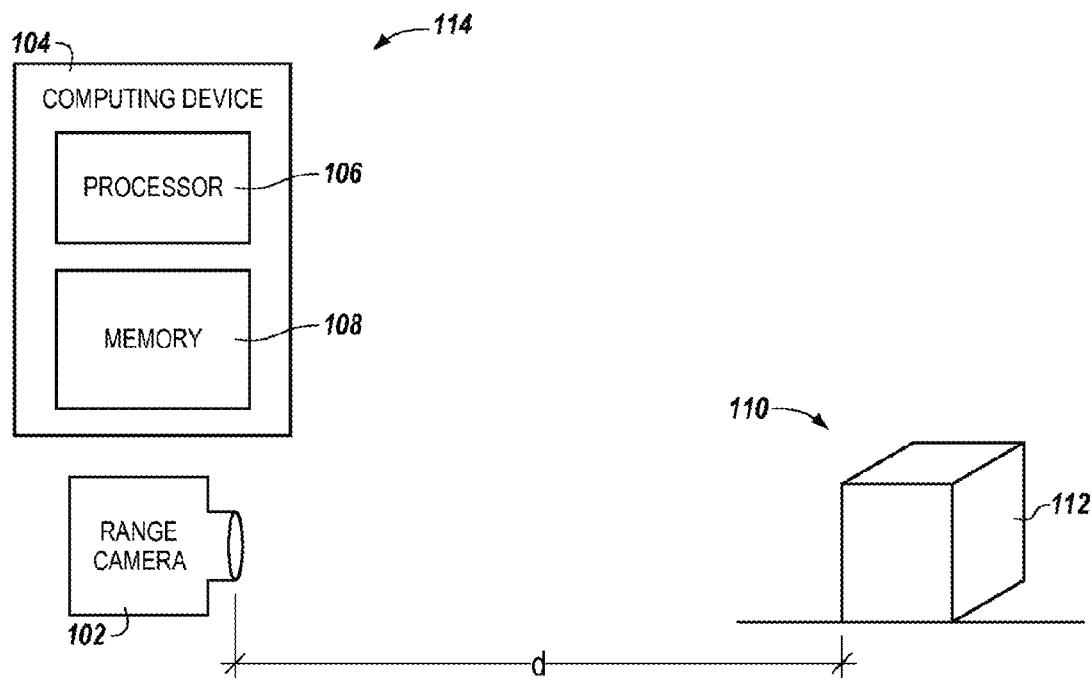
FIG. 2 illustrates a system for determining dimensions associated with an object in accordance with one or more embodiments of the present disclosure.

FIG. 2 illustrates a system 114 for determining dimensions associated with (e.g., of) an object 112 in accordance with one or more embodiments of the present disclosure of this exemplary dimensioning method. In the embodiment illustrated in FIG. 2, object 112 is a rectangular shaped box (e.g., a rectangular shaped package). However, embodiments of the present disclosure are not limited to a particular object shape, object scale, or type of object. For example, in some embodiments, object 112 can be a cylindrical shaped package. As an additional example, object 112 could be a rectangular shaped box with one or more arbitrarily damaged faces.

As shown in FIG. 2, system 114 includes a range camera 102 and a computing device 104. In the embodiment illustrated in FIG. 2, range camera 102 is separate from computing device 104 (e.g., range camera 102 and computing device 104 are separate devices). However, embodiments of the present disclosure are not so limited. For example, in some embodiments, range camera 102 and computing device 104 can be part of the same device (e.g., range camera 102 can include computing device 104, or vice versa). Range camera 102 and computing device 104 can be coupled by and/or communicate via any suitable wired or wireless connection (not shown in FIG. 2).

As shown in FIG. 2, computing device 104 includes a processor 106 and a memory 108. Memory 108 can store executable instructions, such as, for example, computer readable instructions (e.g., software), that can be executed by processor 106. Although not illustrated in FIG. 2, memory 108 can be coupled to processor 106.

Memory 108 can be volatile or nonvolatile memory. Memory 108 can also be removable (e.g., portable) memory, or non-removable (e.g., internal) memory. For example, memory 108 can be random access memory (RAM) (e.g., dynamic random access memory (DRAM) and/or phase change random access memory (PCRA)), read-only memory (ROM) (e.g., electrically erasable programmable read-only memory (EEPROM) and/or compact-disc read-only memory (CD-ROM)), flash memory, a laser disc, a digital versatile disc (DVO) or other optical disk storage, and/or a magnetic medium such as magnetic cassettes, tapes, or disks, among other types of memory.

Further, although memory 108 is illustrated as being located in computing device 104, embodiments of the present disclosure are not so limited. For example, memory 108 can also be located internal to another computing resource (e.g., enabling computer readable instructions to be downloaded over the Internet or another wired or wireless connection).

In some embodiments, range camera 102 can be part of a handheld and/or portable device, such as a barcode scanner. In some embodiments, range camera 102 can be mounted on a tripod.

Range camera 102 can produce (e.g., capture, acquire, and/or generate) a range image of an area (e.g., scene). Range camera 102 can produce the range image of the area using, for example, structured near-infrared (near-IR) illumination, among other techniques for producing range images.

The range image can be a two-dimensional image that shows the distance to different points in the area from a specific point (e.g., from the range camera). The distance can be conveyed in real-world units (e.g., metric units such as meters or millimeters), or the distance can be an integer value (e.g., 11-bit) that can be converted to real-world units. The range image can be a two-dimensional matrix with one channel that can hold integers or floating point values. For instance, the range image can be visualized as different black and white shadings (e.g., different intensities, brightnesses, and/or darknesses) and/or different colors in any color space (e.g., RGB or HSV) that correspond to different distances between the range camera and different points in the area.

For example, range camera 102 can produce a range image of an area (e.g., area 110 illustrated in FIG. 2) in which object 112 is located. That is, range camera 102 can produce a range image of an area that includes object 112.

Range camera 102 can be located a distance d from object 112 when range camera 102 produces the range image, as illustrated in FIG. 2. Distance d can be, for instance, 0.75 to 5.0 meters. However, embodiments of the present disclosure are not limited to a particular distance between range camera 102 and object 112.

The range image produced by range camera 102 can be visualized as black and white shadings corresponding to different distances between range camera 102 and different portions of object 112. For example, the darkness of the shading can increase as the distance between range camera 102 and the different portions of object 112 decreases (e.g., the closer a portion of object 112 is to range camera 102, the darker the portion will appear in the range image). Additionally and/or alternatively, the range image can be visualized as different colors corresponding to the different distances between range camera 102 and the different portions of object 112. Computing device 104 can determine the dimensions (e.g., the length, width, height, diameter, etc.) of object 112 based, at least in part, on the range image produced by range camera 102. For instance, processor 106 can execute executable instructions stored in memory 108 to determine the dimensions of object 112 based, at least in part, on the range image.

For example, computing device 104 can identify a number of planar regions in the range image produced by range camera 102. The identified planar regions may include planar regions that correspond to object 112 (e.g., to surfaces of object 112). That is, computing device 104 can identify planar regions in the range image that correspond to object 112. For instance, in embodiments in which object 112 is a rectangular shaped box (e.g., the embodiment illustrated in FIG. 2), computing device 104 can identify two or three mutually orthogonal planar regions that correspond to surfaces (e.g., faces) of object 112 (e.g., the three surfaces of object 112 shown in FIG. 2).

Once the planar regions that correspond to object 112 have been identified, computing device 104 can determine the dimensions of object 112 based, at least in part, on the identified planar regions (e.g., on the dimensions of the identified planar regions). For example, computing device 104 can determine the dimensions of the planar regions that correspond to object 112. For instance, computing device 104 can determine the dimensions of the planar regions that correspond to object 112 based, at least in part, on the distances of the planar regions within the range image. Computing device 104 can then determine the dimensions of object 112 based, at least in part, on the dimensions of the planar regions.

Computing device 104 can identify the planar regions in the range image that correspond to object 112 by, for example, determining (e.g., calculating) coordinates (e.g., real-world x, y, z coordinates in millimeters) for each point (e.g., each row, column, and depth tuple) in the range image. Intrinsic calibration parameters associated with range camera 102 can be used to convert each point in the range image into the real-world coordinates. The system can undistort the range image using, for example, the distortion coefficients for the camera to correct for radial, tangential, and/or other types of lens distortion. In some embodiments, the two-dimensional matrix of the real-world coordinates may be downsized by a factor between 0.25 and 0.5.

Computing device 104 can then build a number of planar regions through the determined real-world coordinates. For example, a number of planar regions can be built near the points, wherein the planar regions may include planes of best fit to the points. Computing device 104 can retain the planar regions that are within a particular (e.g., pre-defined) size and/or a particular portion of the range image. The planar regions that are not within the particular size or the particular portion of the range image can be disregarded.

Computing device 104 can then upsample each of the planar regions (e.g., the mask of each of the planar regions) that are within the particular size and/or the particular portion of the range image to fit in an image of the original (e.g., full) dimensions of the range image. Computing device 104 can then refine the planar regions to include only points that lie within an upper bound from the planar regions.

Computing device 104 can then fit a polygon to each of the planar regions that are within the particular size and/or the particular portion of the range image, and retain the planar regions whose fitted polygon has four vertices and is convex. These retained planar regions are the planar regions that correspond to object 112 (e.g., to surfaces of object 112). The planar regions whose fitted polygon does not have four vertices and/or is not convex can be disregarded. Computing device 104 can also disregard the planar regions in the range image that correspond to the ground plane and background clutter of area 110.

Computing device 104 can disregard (e.g., ignore) edge regions in the range image that correspond to the edges of area 110 while identifying the planar regions in the range image that correspond to object 112. For example, computing device 104 can run a three dimensional edge detector on the range image before identifying planar regions in the range image, and can then disregard the detected edge regions while identifying the planar regions. The edge detection can also identify non-uniform regions that can be disregarded while identifying the planar regions.

Once the planar regions that correspond to object 112 have been identified, computing device 104 can determine the dimensions of object 112 based, at least in part, on the identified planar regions (e.g., on the dimensions of the identified planar regions). For example, computing device 104 can determine the dimensions of object 112 by arranging the identified planar regions (e.g., the planar regions whose fitted polygon has four vertices and is convex) into a shape corresponding to the shape of object 112, and determining a measure of centrality (e.g., an average) for the dimensions of clustered edges of the arranged shape. The dimensions of the edges of the arranged shape correspond to the dimensions of object 112.

Once the arranged shape (e.g., the bounding volume of the object) is constructed, computing device 104 can perform (e.g., run) a number of quality checks. For example, in embodiments in which object 112 is a rectangular shaped box, computing device 104 can determine whether the identified planar regions fit together into a rectangular arrangement that approximates a true rectangular box within (e.g., below) a particular error threshold.

In some embodiments, computing device 104 can include a user interface (not shown in FIG. 2). The user interface can include, for example, a screen that can provide (e.g., display and/or present) information to a user of computing device 104. For example, the user interface can provide the determined dimensions of object 112 to a user of computing device 104.

In some embodiments, computing device 104 can determine the volume of object 112 based, at least in part, on the determined dimensions of object 112. Computing device 104 can provide the determined volume to a user of computing device 104 via the user interface.

Figure 3:
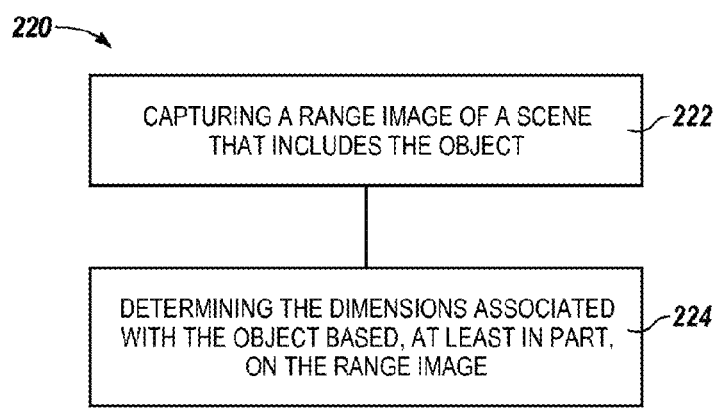
FIG. 3 illustrates a method for determining dimensions associated with an object in accordance with one or more embodiments of the present disclosure.

FIG. 3 illustrates a method 220 for determining dimensions associated with (e.g., of) an object in accordance with one or more embodiments of the present disclosure. The object can be, for example, object 112 previously described in connection with FIG. 2. Method 220 can be performed, for example, by computing device 104 previously described in connection with FIG. 2.

At block 222, method 220 includes capturing a range image of a scene that includes the object. The range image can be, for example, analogous to the range image previously described in connection with FIG. 2 (e.g., the range image of the scene can be analogous to the range image of area 110 illustrated in FIG. 2), and the range image can be captured in a manner analogous to that previously described in connection with FIG. 2.

At block 224, method 220 includes determining the dimensions (e.g., the length, width, height, diameter, etc.) associated with the object based, at least in part, on the range image. For example, the dimensions associated with (e.g., of) the object can be determined in a manner analogous to that previously described in connection with FIG. 2. In some embodiments, the volume of the object can be determined based, at least in part, on the determined dimensions associated with the object.

As an additional example, determining the dimensions associated with the object can include determining the dimensions of the smallest volume rectangular box large enough to contain the object based, at least in part, on the range image. The dimensions of the smallest volume rectangular box large enough to contain the object can be determined by, for example, determining and disregarding (e.g., masking out) the portion (e.g., part) of the range image containing information (e.g., data) associated with (e.g., from) the ground plane of the scene that includes the object, determining (e.g., finding) the height of a plane that is parallel to the ground plane and above which the object does not extend, projecting additional (e.g., other) portions of the range image on the ground plane, and determining (e.g., estimating) a bounding rectangle of the projected portions of the range image on the ground plane.

Although specific embodiments have been illustrated and described herein, those of ordinary skill in the art will appreciate that any arrangement calculated to achieve the same techniques can be substituted for the specific embodiments shown. This disclosure of exemplary methods of determining the dimensions of an object is intended to cover any and all adaptations or variations of various embodiments of the disclosure.

An exemplary method of determining the dimensions of an object and an exemplary terminal for dimensioning objects are described in U.S. patent application Ser. No. 13/471,973 filed at the U.S. Patent and Trademark Office on May 15, 2012 and titled "Terminals and Methods for Dimensioning Objects," which is hereby incorporated by reference in its entirety.

Figure 4:
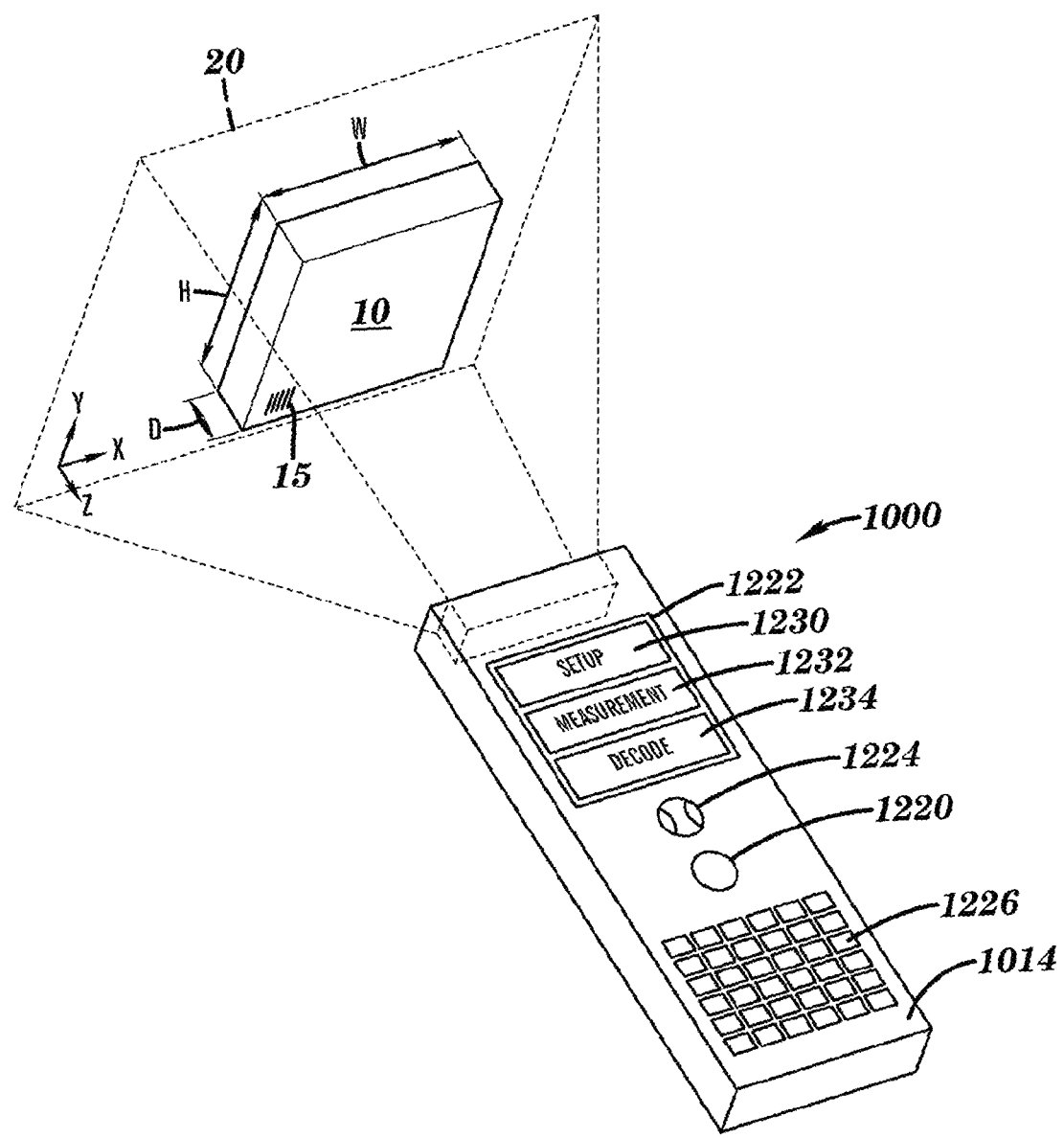
FIG. 4 is a schematic physical form view of one embodiment of a terminal in accordance with aspects of the present invention.

FIG. 4 illustrates one embodiment of a terminal 1000 operable for measuring at least one dimension of an object 10 in accordance with aspects of the present invention. For example, terminal 1000 may determine a height H, a width W, and a depth D of an object. In addition, terminal 1000 may be operable to read a decodable indicia 15 such as a barcode disposed on the object. For example, the terminal may be suitable for shipping applications in which an object such as a package is subject to shipping from one location to another location. The dimension (dimensioning) information and other measurement (e.g., volume measurement information) respecting object 10 may be used, e.g., to determine a cost for shipping a package or for determining a proper arrangement of the package in a shipping container.

In one embodiment, a terminal in accordance with aspects of the present invention may include at least one or more imaging subsystems such as one or more camera modules and an actuator to adjust the pointing angle of the one or more camera modules to provide true stereo imaging. The terminal may be operable to attempt to determine at least one of a height, a width, and a depth based on effecting the adjustment of the pointing angle of the one or more camera modules.

For example, a terminal in accordance with aspects of the present invention may include at least one or more imaging subsystems such as camera modules and an actuator based on wires of nickel-titanium shape memory alloy (SMA) and an associated control and heating ASIC (application-specific integrated circuit) to adjust the pointing angle of the one or more camera modules to provide true stereo imaging. Using true stereo imaging, the distance to the package can be determined by measuring the amount of drive current or voltage drop across the SMA actuator. The terminal may be operable to attempt to determine at least one of a height, a width, a depth, based on the actuator effecting the adjustment of the pointing angle of the one or more camera modules, the measured distance, and the obtained image of the object.

With reference still to FIG. 4, terminal 1000 in one embodiment may include a trigger 1220, a display 1222, a pointer mechanism 1224, and a keyboard 1226 disposed on a common side of a hand held housing 1014. Display 1222 and pointer mechanism 1224 in combination can be regarded as a user interface of terminal 1000. Terminal 1000 may incorporate a graphical user interface and may present buttons 1230, 1232, and 1234 corresponding to various operating modes such as a setup mode, a spatial measurement mode, and an indicia decode mode, respectively. Display 1222 in one embodiment can incorporate a touch panel for navigation and virtual actuator selection in which case a user interface of terminal 1000 can be provided by display 1222. Hand held housing 1014 of terminal 1000 can in another embodiment be devoid of a display and can be in a gun style form factor. The terminal may be an indicia reading terminal and may generally include hand held indicia reading terminals, fixed indicia reading terminals, and other terminals. Those of ordinary skill in the art will recognize that the present invention is applicable to a variety of other devices having an imaging subassembly which may be configured as, for example, mobile phones, cell phones, satellite phones, smart phones, telemetric devices, personal data assistants, and other devices.

Figure 5:
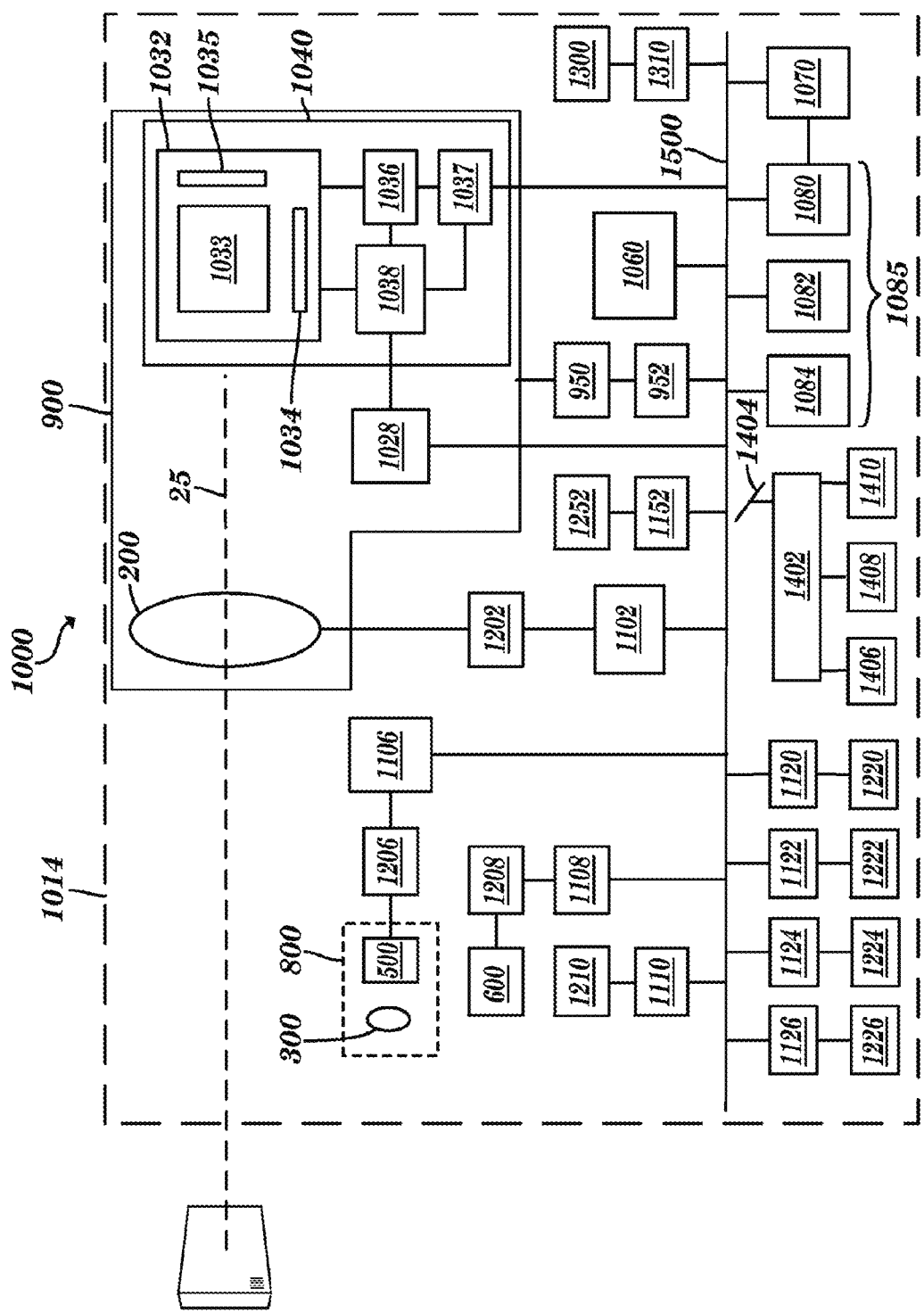
FIG. 5 is a block diagram of the terminal of FIG. 4.

FIG. 5 depicts a block diagram of one embodiment of terminal 1000. Terminal 1000 may generally include at least one imaging subsystem 900, an illumination subsystem 800, hand held housing 1014, a memory 1085, and a processor 1060. Imaging subsystem 900 may include an imaging optics assembly 200 operable for focusing an image onto an image sensor pixel array 1033. An actuator 950 is operably connected to imaging subsystem 900 for moving imaging subsystem 900 and operably connected to processor 1060 (FIG. 5) via interface 952. Hand held housing 1014 may encapsulate illumination subsystem 800, imaging subsystem 900, and actuator 950. Memory 1085 is capable of storing and or capturing a frame of image data, in which the frame of image data may represent light incident on image sensor array 1033. After an exposure period, a frame of image data can be read out. Analog image signals that are read out of array 1033 can be amplified by gain block 1036 converted into digital form byanalog-to-digital converter 1037 and sent to DMA unit 1070. DMA unit 1070, in turn, can transfer digitized image data into volatile memory 1080. Processor 1060 can address one or more frames of image data retained in volatile memory 1080 for processing of the frames for determining one or more dimensions of the object and/or for decoding of decodable indicia represented on the object.

Figure 6:
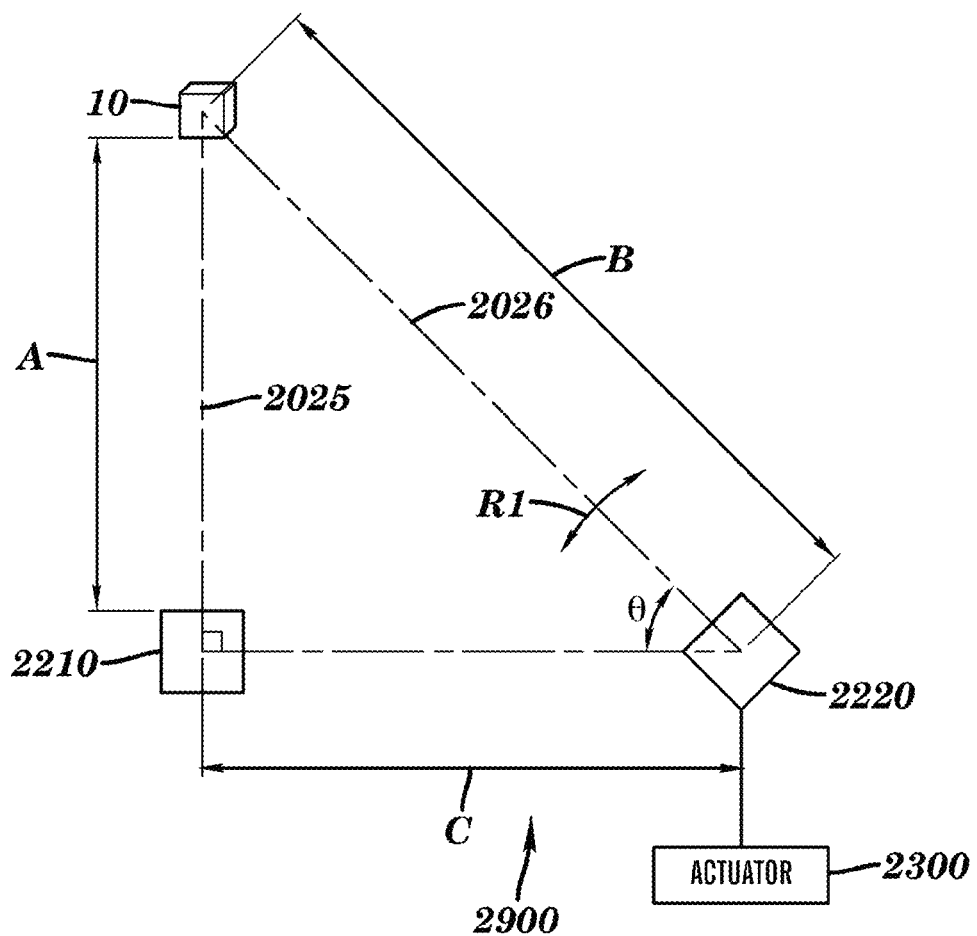
FIG. 6 is a diagrammatic illustration of one embodiment of an imaging subsystem for use in the terminal of FIG. 4.

FIG. 6 illustrates one embodiment of the imaging subsystem employable in terminal 1000. In this exemplary embodiment, an imaging subsystem 2900 may include a first fixed imaging subsystem 2210, and a second movable imaging subsystem 2220. An actuator 2300 may be operably connected to imaging subsystem 2220 for moving imaging subsystem 2220. First fixed imaging subsystem 2210 is operable for obtaining a first image or frame of image data of the object, and second movable imaging subsystem 2220 is operable for obtaining a second image or frame of image data of the object. Actuator 2300 is operable to bring the second image into alignment with the first image as described in greater detail below. In addition, either the first fixed imaging subsystem 2210 or the second movable imaging subsystem 2220 may also be employed to obtain an image of decodable indicia 15 (FIG. 4) such as a decodable barcode.

FIGS. 6-10 illustrate one embodiment of the terminal in a spatial measurement mode. For example, a spatial measurement mode may be made active by selection of button 1232 (FIG. 4). In a spatial measurement operating mode, terminal 1000 (FIG. 4) can perform one or more spatial measurements, e.g., measurements to determine one or more of a terminal to target distance (z distance) or a dimension (e.g., h, w, d) of an object or another spatial related measurement (e.g., a volume measurement, a distance measurement between any two points).

Figure 7:
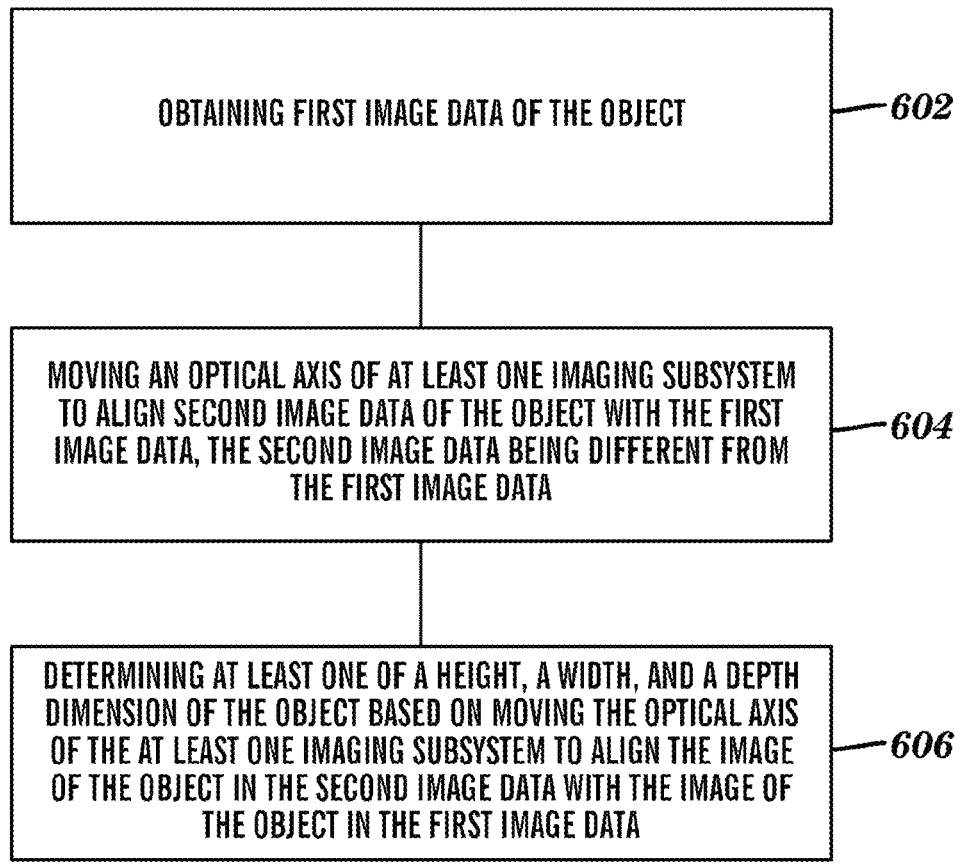
FIG. 7 is a flowchart illustrating one embodiment of a method for measuring at least one dimension of an object using the terminal of FIG. 4.
Figure 8:
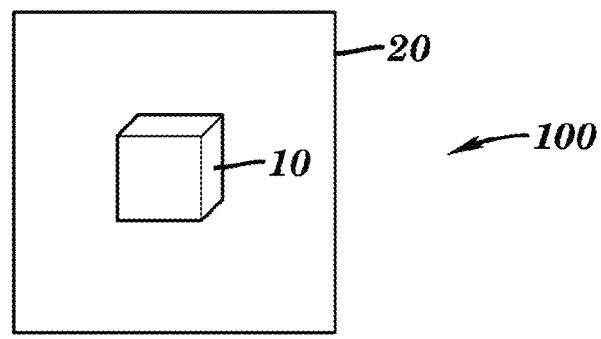
FIG. 8 is an illustration of a first image of the object obtained using the fixed imaging subsystem of FIG. 6.
Figure 9:
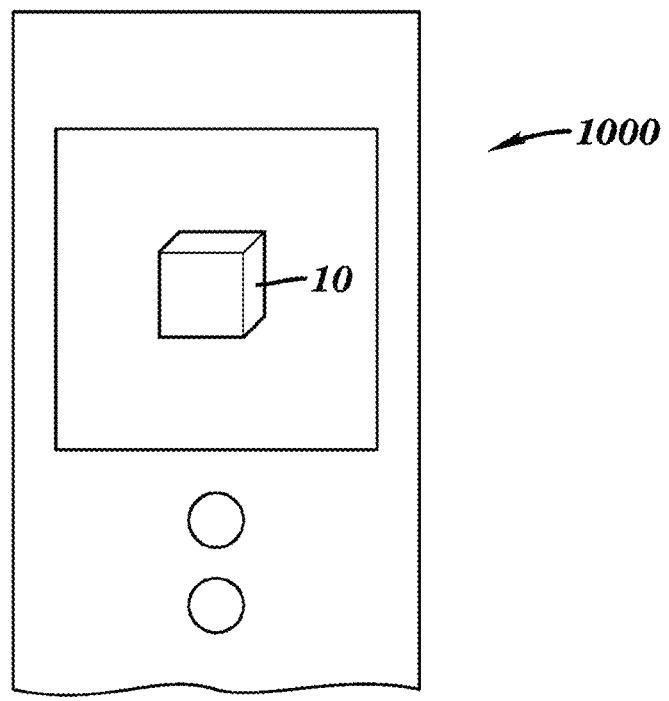
FIG. 9 is a view of the terminal of FIG. 4 illustrating on the display the object disposed in the center of the display for use in obtaining the first image of FIG. 8.
Figure 10:
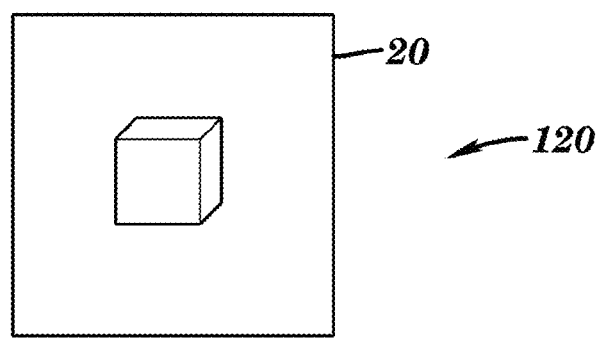
FIG. 10 is a second aligned image of the object obtained using the movable imaging subsystem of FIG. 6.

Initially, at block 602 as shown in FIG. 7, terminal 10 may obtain or capture first image data, e.g., at least a portion of a frame of image data such as a first image 100 using fixed imaging subsystem 2210 (FIG. 6) within a field of view 20 (FIGS. 4 and 8). For example, a user may operate terminal 1000 to display object 10 using fixed imaging subsystem 2210 (FIG. 6) in the center of display 1222 as shown in FIG. 9. Terminal 1000 can be configured so that block 602 is executed responsively to trigger 1220 (FIG. 4) being initiated. With reference again to FIG. 3, imaging the object generally in the center of the display results when the object is aligned with an imaging axis or optical axis 2025 of fixed imaging subsystem 2210. For example, the optical axis may be a line or an imaginary line that defines the path along which light propagates through the system. The optical axis may passes through the center of curvature of the imaging optics assembly and may be coincident with a mechanical axis of imaging subsystem 2210.

With reference again to FIG. 7, at 604, terminal 1000 may be adapted to move an optical axis 2026 (FIG. 6) of movable imaging subsystem 2220 (FIG. 6) using actuator 2300 (FIG. 6) to align second image data, e.g., at least a portion of a frame of image data such as a second image 120 using movable imaging subsystem 2220 (FIG. 6) within a field of view 20 (FIGS. 4 and 10) with the first image data. As shown in FIG. 6, optical axis 2026 of imaging subsystem 2220 may be pivoted, tilted or deflected, for example in the direction of double-headed arrow R1 in response to actuator 2300 to align the second image of the object with the object in the first image.

For example, the terminal may include a suitable software program employing a subtraction routine to determine when the image of the object in the second image data is aligned with the object in the first image data. The closer the aligned images of the object are, the resulting subtraction of the two images such as subtracting the amplitude of the corresponding pixels of the imagers will become smaller as the images align and match. The entire images of the object may be compared, or a portion of the images of the object may be compared. Thus, the better the images of the object are aligned, the smaller the subtracted difference will be.

A shown in FIG. 7, at 606, an attempt to determine at least one of a height, a width, and a depth dimension of the object is made based on moving the optical axis of the movable imaging subsystem to align the image of the object in the second image data with the image of the object in the first image data. For example, the position of the angle of the optical axis is related to the distance between the terminal and the object, and the position of the angle of the optical axis and/or the distance between the terminal and the object may be used in combination with the number of pixels used for imaging the object in the image sensor array to the determine the dimensions of the object.

With reference again to FIG. 6, the angle of the optical axis of the movable imaging subsystem relative to the terminal is related to the distance from the movable imaging subsystem (e.g., the front of the images sensor array) to the object (e.g., front surface, point, edge, etc.), and the angle of the optical axis of the movable imaging subsystem relative to the terminal is related to the distance from the fixed imaging subsystem (e.g., the front of the images sensor array) to the object (e.g., front surface, point, edge, etc.).

For example, the relationship between an angle Θ of the optical axis of the movable imaging subsystem relative to the terminal, a distance A from the fixed imaging subsystem to the object, and a distance C between the fixed imaging subsystem and the movable imaging subsystem may be expressed as follows:

$$\tan \Theta = A/C.$$

The relationship between angle Θ of the optical axis of the movable imaging subsystem relative to the terminal, a distance B from the fixed imaging subsystem to the object, and distance C between the fixed imaging subsystem and the movable imaging subsystem may be expressed as follows:

$$\cos \Theta = C/B.$$

Figure 11:
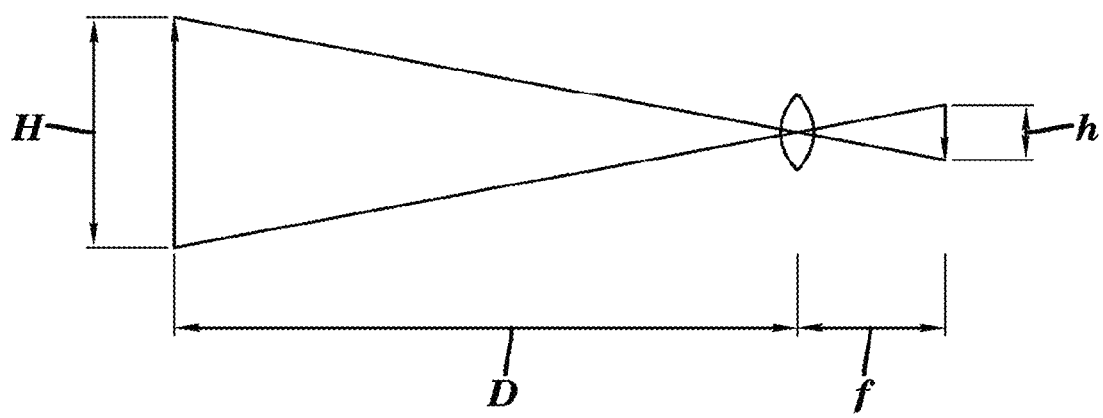
FIG. 11 is a diagrammatic illustration of the geometry between an object and the image of the object on an image sensor array.

With reference to FIG. 11, the actual size of an object relative to the size of the object observed on an image sensor array may be generally defined as follows:

$$\frac{h}{f} = \frac{H}{D}.$$

where h is a dimension of the object (such as height) of the object on the image sensor array, f is focal length of the imaging optics lens, H is a dimension of the actual object (such as height), and D is distance from the object to the imaging optic lens.

With reference to measuring, for example a height dimension, knowing the vertical size of the imaging sensor (e.g., the height in millimeters or inches) and number of pixels vertically disposed along the imaging sensor, the height of the image of the object occupying a portion of the imaging sensor would be related to a ratio of the number of pixels forming the imaged object to the total pixels disposed vertically along the image sensor.

For example, a height of an observed image on the imaging sensor may be determined as follows:

$$H = \frac{D \times h}{f}.$$

In one embodiment, an actual height measurement may be determined as follows:

$$h = \frac{\text{observed object image height(pixels)}}{\text{height of sensor(pixels)}} \times \text{height of sensor}(e.g., \text{in inches}).$$

For example, where an observed image of the object is 100 pixels high, and a distance D is 5 feet, the actual object height would be greater than when the observed image of the object is 100 pixels high, and a distance D is 2 feet. Other actual dimensions (e.g., width and depth) of the object may be similarly obtained.

From the present description, it will be appreciated that the terminal may be setup using a suitable setup routine that is accessed by a user or by a manufacturer for coordinating the predetermined actual object to dimensioning at various distances, e.g., coordinate a voltage or current reading required to effect the actuator to align the object in the second image with the image of the object in the first image, to create a lookup table. Alternatively, suitable programming or algorithms employing, for example, the relationships described above, may be employed to determine actual dimensions based on the number of pixels observed on the imaging sensor. In addition, suitable edge detection or shape identifier algorithms or processing may be employed with analyzing standard objects, e.g., boxes, cylindrical tubes, triangular packages, etc., to determine and/or confirm determined dimensional measurements.

Figure 12:
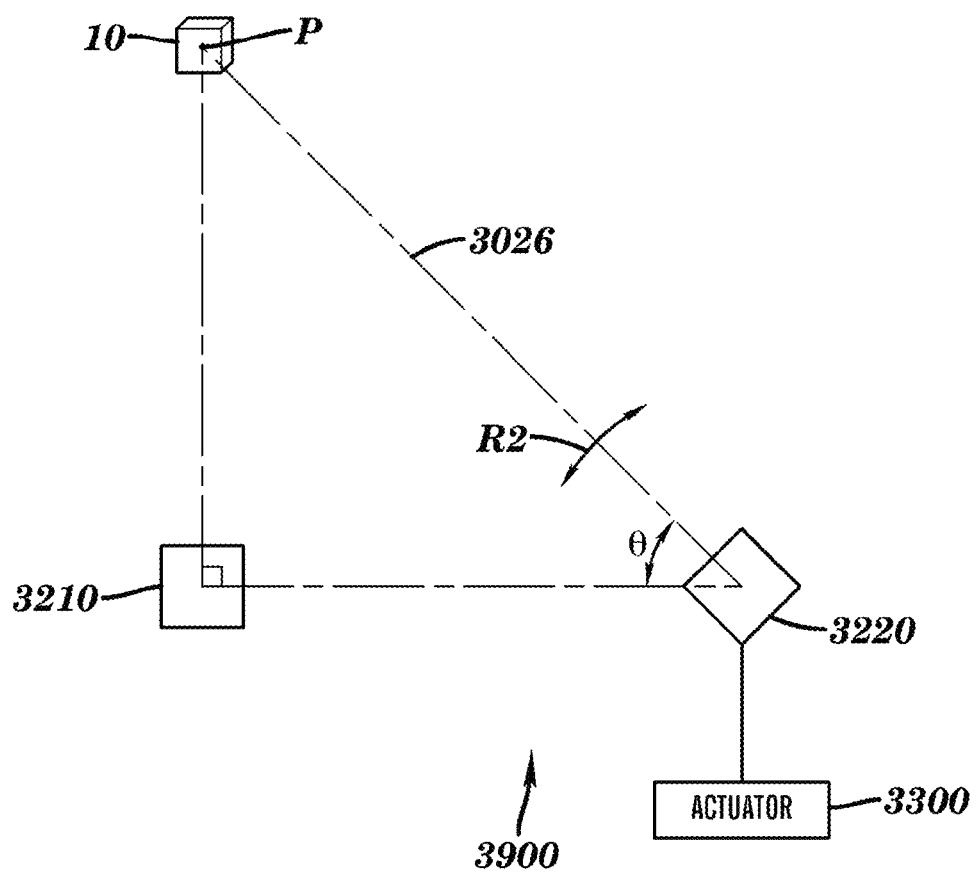
FIG. 12 is a diagrammatic illustration of another embodiment of an imaging subsystem for use in the terminal of FIG. 4, which terminal may include an aimer.

FIG. 12 illustrates another embodiment of an imaging subsystem employable in terminal 1000 (FIG. 4). Alignment of the second image may also be accomplished using a projected image pattern P from an aimer onto the object to determine the dimensions of the object. In activating the terminal, an aimer such as a laser aimer may project an aimer pattern onto the object. The projected aimer pattern may be a dot, point, or other pattern. The imaged object with the dot in the second image may be aligned, e.g., the actuator effective to move the movable imaging subsystem so that the laser dot on the imaged second image aligns with the laser dot in the first image. The aimer pattern may be orthogonal lines or a series of dots that a user may be able to align adjacent to or along one or more sides or edges such as orthogonal sides or edges of the object.

In this exemplary embodiment, an imaging subsystem 3900 may include a first fixed imaging subsystem 3210, and a second movable imaging subsystem 3220. In addition, terminal 1000 (FIG. 4) may include an aiming subsystem 600 (FIG. 5) for projecting an aiming pattern onto the object, in accordance with aspects of the present invention. An actuator 3300 may be operably attached to imaging subsystem 3220 for moving imaging subsystem 3220. First fixed imaging subsystem 3210 is operable for obtaining a first image of the object having an aimer pattern P such as a point or other pattern. Second movable imaging subsystem 3220 is operable for obtaining a second image of the object. Actuator 3300 is operable to bring the second image into alignment with the first image be aligning point P in the second image with point p in the second image. For example, an optical axis 3026 of imaging subsystem 3220 may be pivoted, tilted or deflected, for example in the direction of double-headed arrow R2 in response to actuator 3300 to align the second image of the object with the object in the first image. In addition, either the first fixed imaging subsystem 3210, or the second movable imaging subsystem 3220 may also be employed to obtain an image of decodable indicia 15 (FIG. 4) such as a decodable barcode.

Figure 13:
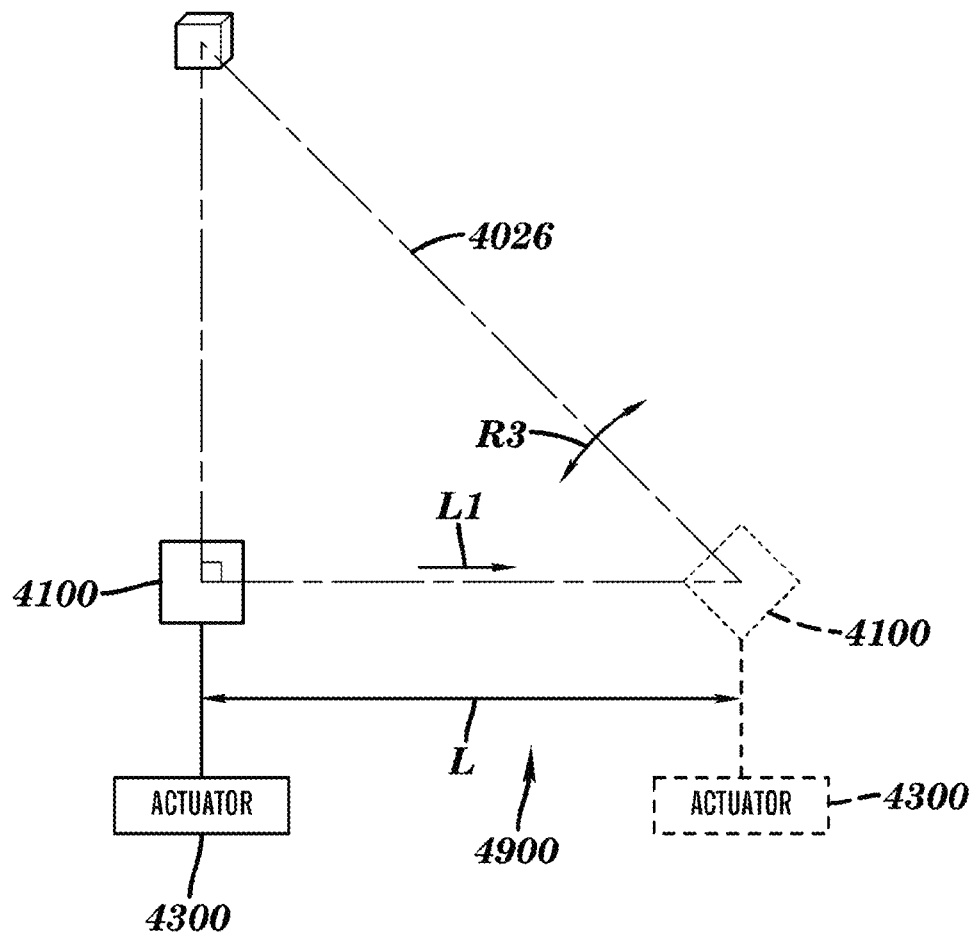
FIG. 13 is a diagrammatic illustration of another embodiment of a single movable imaging subsystem and actuator for use in the terminal of FIG. 4.

FIG. 13 illustrates another embodiment of an imaging subsystem employable in terminal 1000 (FIG. 4). In this embodiment, an imaging subsystem 4900 may be employed in accordance with aspects of the present invention. For example, an imaging subsystem 4900 may include a movable imaging subsystem 4100. An actuator 4300 may be operably attached to imaging subsystem 4100 for moving imaging subsystem 4100 from a first position to a second position remote from the first position. Movable imaging subsystem 4100 is operable for obtaining a first image of the object at the first position or orientation, and after taking a first image, moved or translate the movable imaging subsystem to a second location or orientation such as in the direction of arrow L1 using actuator 4300 to provide a distance L between the first position and the second position prior to aligning the object and obtaining a second image of the object. Actuator 4300 is also operable to bring the second image into alignment with the first image. For example, an optical axis 4026 of imaging subsystem 4100 may be pivoted, tilted or deflected, for example in the direction of double-headed arrow R3 in response to actuator 4100 to align the second image of the object with the object in the first image. As noted above, terminal 1000 (FIG. 4) may include an aiming subsystem 600 (FIG. 5) for projecting an aiming pattern onto the object in combination with imaging subsystem 4900. In addition, the movable imaging subsystem 4100 may also be employed to obtain an image of decodable indicia 15 (FIG. 4) such as a decodable barcode.

From the present description of the various imaging subsystems and actuators, it will be appreciated that the second aligned image be performed in an operable time after the first image so that the effect of the user holding and moving the terminal when obtaining the images or the object moving when obtaining the image does not result in errors in determining the one or more dimensions of the object. It is desirable minimize the time delay between the first image and the second aligned image. For example, it may be suitable that the images be obtained within about 0.5 second or less, or possibly within about ⅛ second or less, about ¹⁄₁₆ second or less, or about ¹⁄₃₂ second or less.

With reference to FIGS. 6, 11, and 12, the actuators employed in the various embodiments may comprise one or more actuators which are positioned in the terminal to move the movable imagining subsystem in accordance with instructions received from processor 1060 (FIG. 5). Examples of a suitable actuator include a shaped memory alloy (SMA) which changes in length in response to an electrical bias, a piezo actuator, a MEMS actuator, and other types of electromechanical actuators. The actuator may allow for moving or pivoting the optical axis of the imaging optics assembly, or in connection with the actuator in FIG. 13, also moving the imaging subsystem from side-to-side along a line or a curve.

Figure 14:
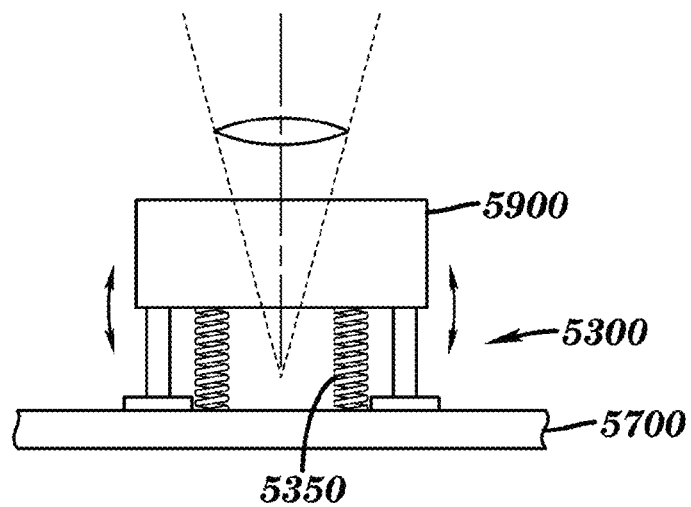
FIG. 14 is an elevational side view of one implementation of an imaging subsystem and actuator for use in the terminal of FIG. 4.
Figure 15:
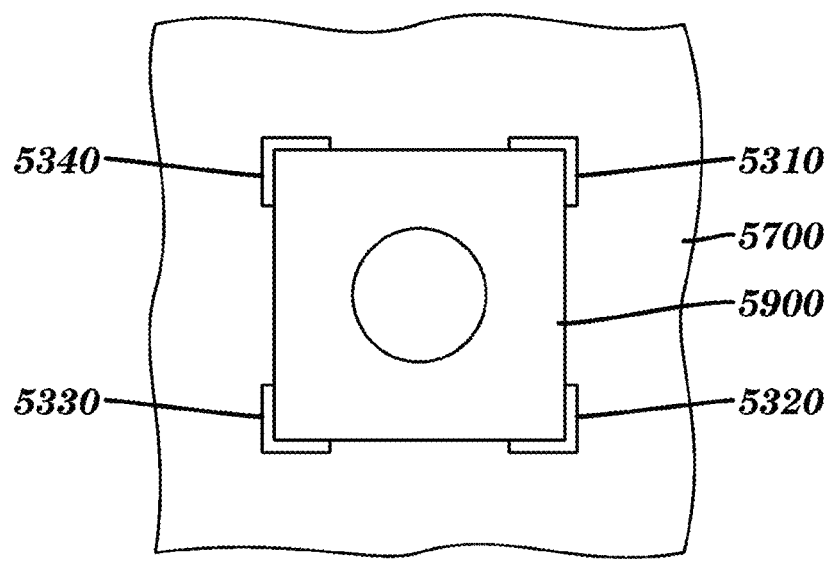
FIG. 15 is a top view of the imaging subsystem and actuator of FIG. 14.

As shown in FIGS. 14 and 15, an actuator 5300 may comprise four actuators 5310, 5320, 5330, and 5430 disposed beneath each corner of an imaging subsystem 5900 to movable support the imaging subsystem on a circuit board 5700. The actuators may be selected so that they are capable of compressing and expanding and, when mounted to the circuit board, are capable of pivoting the imaging subsystem relative to the circuit board. The movement of imaging subsystem by the actuators may occur in response to a signal from the processor. The actuators may employ a shaped memory alloy (SMA) member which cooperates with one or more biasing elements 5350 such as springs, for operably moving the imaging subsystem. In addition, although four actuators are shown as being employed, more or fewer than four actuators may be used. The processor may process the comparison of the first image to the observed image obtained from the movable imaging subsystem, and based on the comparison, determine the required adjustment of the position of the movable imaging subsystem to align the object in the second image with the obtained image in the first obtained image.

In addition, the terminal may include a motion sensor 1300 (FIG. 5) operably connected to processor 1060 (FIG. 5) via interface 1310 (FIG. 5) operable to remove the effect of shaking due to the user holding the terminal at the same time as obtaining the first image and second aligned image which is used for determining one of more dimensions of the object as described above. A suitable system for use in the above noted terminal may include the image stabilizer for a microcamera disclosed in U.S. Pat. No. 7,307,653 issued to Dutta, the entire contents of which are incorporated herein by reference.

The imaging optics assembly may employ a fixed focus imaging optics assembly. For example, the optics may be focused at a hyperfocal distance so that objects in the images from some near distance to infinity will be sharp. The imaging optics assembly may be focused at a distance of 15 inches or greater, in the range of 3 or 4 feet distance, or at other distances. Alternatively, the imaging optics assembly may comprise an autofocus lens. The exemplary terminal may include a suitable shape memory alloy actuator apparatus for controlling an imaging subassembly such as a microcamera disclosed in U.S. Pat. No. 7,974,025 by Topliss, the entire contents of which are incorporated herein by reference.

From the present description, it will be appreciated that the exemplary terminal may be operably employed to separately obtain images and dimensions of the various sides of an object, e.g., two or more of a front elevational view, a side elevational view, and a top view, may be separately obtained by a user similar to measuring an object as one would with a ruler.

The exemplary terminal may include a suitable autofocusing microcamera such as a microcamera disclosed in U.S. Patent Application Publication No. 2011/0279916 by Brown et al., the entire contents of which is incorporated herein by reference.

In addition, it will be appreciated that the described imaging subsystems in the embodiments shown in FIGS. 6, 12, and 13, may employ fluid lenses or adaptive lenses. For example, a fluid lens or adaptive lens may comprise an interface between two fluids having dissimilar optical indices. The shape of the interface can be changed by the application of external forces so that light passing across the interface can be directed to propagate in desired directions. As a result, the optical characteristics of a fluid lens, such its focal length and the orientation of its optical axis, can be changed. With use of a fluid lens or adaptive lens, for example, an actuator may be operable to apply pressure to the fluid to change the shape of the lens. In another embodiments, an actuator may be operable to apply a DC voltage across a coating of the fluid to decrease its water repellency in a process called electrowetting to change the shape of the lens. The exemplary terminal may include a suitable fluid lens as disclosed in U.S. Pat. No. 8,027,096 issued to Feng et al., the entire contents of which is incorporated herein by reference.

Figure 16:
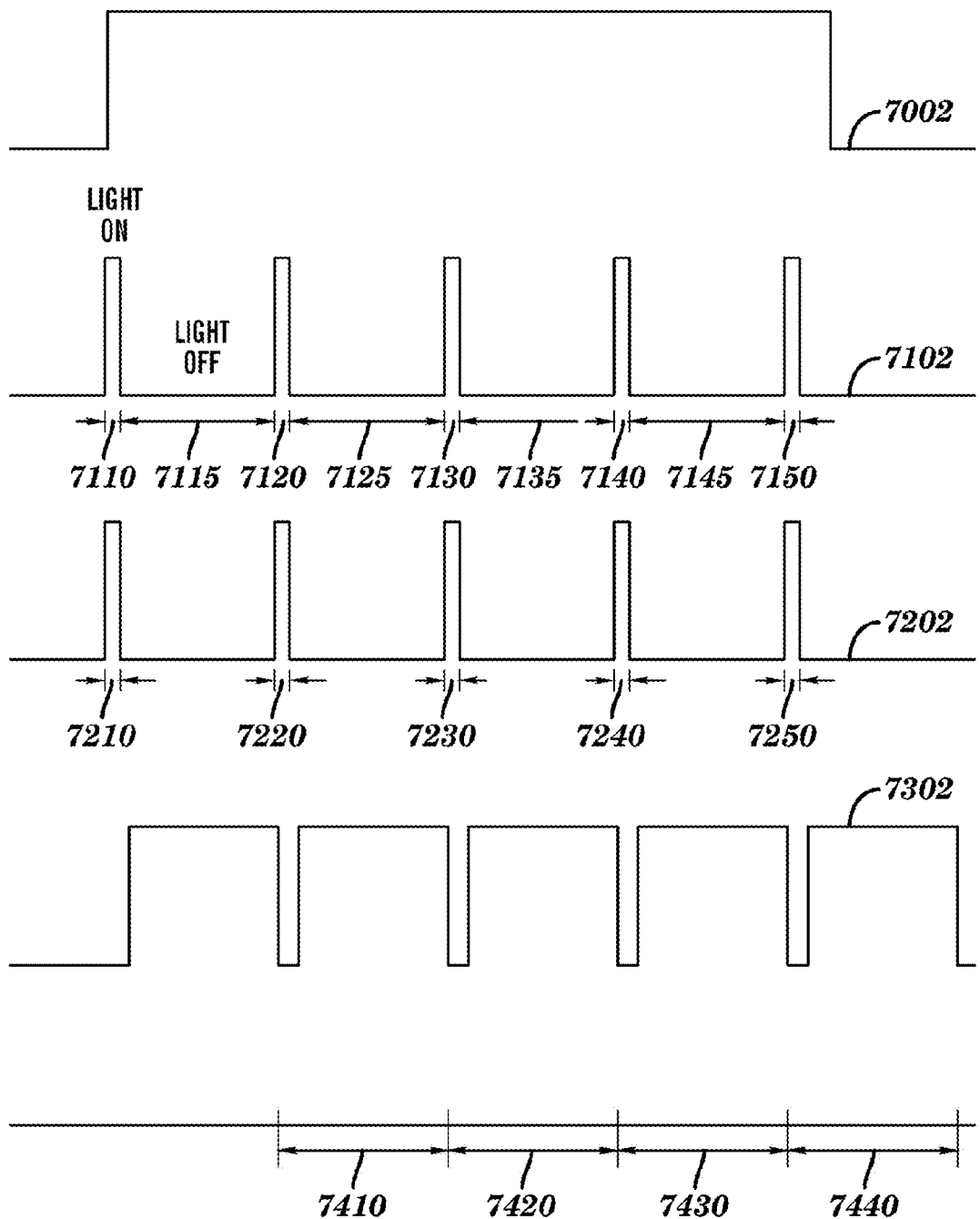
FIG. 16 is a timing diagram illustrating one embodiment for use in determining one or more dimensions and for decoding a decodable performed by the indicia reading terminal of FIG. 4.

With reference to FIG. 16, a timing diagram may be employed for obtaining a first image of the object for use in determining one or more dimensions as described above, and also used for decoding a decodable indicia disposed on an object using for example, the first imaging subassembly. At the same time or generally simultaneously after activation of the first imaging subassembly, the movable subassembly and actuator may be activated to determine one or more dimensions as described above. For example, the first frame of image data of the object using the first imaging subassembly may be used in combination with the aligned image of the object using the movable imaging subsystem.

A signal 7002 may be a trigger signal which can be made active by actuation of trigger 1220 (FIG. 4), and which can be deactivated by releasing of trigger 1220 (FIG. 4). A trigger signal may also become inactive after a time out period or after a successful decode of a decodable indicia.

A signal 7102 illustrates illumination subsystem 800 (FIG. 5) having an energization level, e.g., illustrating an illumination pattern where illumination or light is alternatively turned on and off. Periods 7110, 7120, 7130, 7140, and 7150 illustrate where illumination is on, and periods 7115, 7125, 7135, and 7145 illustrate where illumination is off.

A signal 7202 is an exposure control signal illustrating active states defining exposure periods and inactive states intermediate the exposure periods for an image sensor of a terminal. For example, in an active state, an image sensor array of terminal 1000 (FIG. 4) is sensitive to light incident thereon. Exposure control signal 7202 can be applied to an image sensor array of terminal 1000 (FIG. 4) so that pixels of an image sensor array are sensitive to light during active periods of the exposure control signal and not sensitive to light during inactive periods thereof. During exposure periods 7210, 7220, 7230, 7240, and 7250, the image sensor array of terminal 1000 (FIG. 4) is sensitive to light incident thereon.

A signal 7302 is a readout control signal illustrating the exposed pixels in the image sensor array being transferred to memory or secondary storage in the imager so that the imager may be operable to being ready for the next active portion of the exposure control signal. In the timing diagram of FIG. 16, period 7410 may be used in combination with movable imaging subsystem to determine one or more dimensions as described above. In addition, in the timing diagram of FIG. 16, periods 7410, 7420, 7430, and 7440 are periods in which processer 1060 (FIG. 5) may process one or more frames of image data. For example, periods 7410, 7420, 7430, and 7440 may correspond to one or more attempts to decode decodable indicia in which the image resulted during periods when indicia reading terminal 1000 (FIG. 4) was illuminating the decodable indicia.

With reference again to FIG. 5, indicia reading terminal 1000 may include an image sensor 1032 comprising multiple pixel image sensor array 1033 having pixels arranged in rows and columns of pixels, associated column circuitry 1034 and row circuitry 1035. Associated with the image sensor 1032 can be amplifier circuitry 1036 (amplifier), and an analog to digital converter 1037 which converts image information in the form of analog signals read out of image sensor array 1033 into image information in the form of digital signals. Image sensor 1032 can also have an associated timing and control circuit 1038 for use in controlling, e.g., the exposure period of image sensor 1032, gain applied to the amplifier 1036, etc. The noted circuit components 1032, 1036, 1037, and 1038 can be packaged into a common image sensor integrated circuit 1040. Image sensor integrated circuit 1040 can incorporate fewer than the noted number of components. Image sensor integrated circuit 1040 including image sensor array 1033 and imaging lens assembly 200 can be incorporated in hand held housing 1014.

In one example, image sensor integrated circuit 1040 can be provided e.g., by an MT9V022 (752×480 pixel array) or an MT9V023 (752×480 pixel array) image sensor integrated circuit available from Aptina Imaging (formerly Micron Technology, Inc.). In one example, image sensor array 1033 can be a hybrid monochrome and color image sensor array having a first subset of monochrome pixels without color filter elements and a second subset of color pixels having color sensitive filter elements. In one example, image sensor integrated circuit 1040 can incorporate a Bayer pattern filter, so that defined at the image sensor array 1033 are red pixels at red pixel positions, green pixels at green pixel positions, and blue pixels at blue pixel positions. Frames that are provided utilizing such an image sensor array incorporating a Bayer pattern can include red pixel values at red pixel positions, green pixel values at green pixel positions, and blue pixel values at blue pixel positions. In an embodiment incorporating a Bayer pattern image sensor array, processor 1060 prior to subjecting a frame to further processing can interpolate pixel values at frame pixel positions intermediate of green pixel positions utilizing green pixel values for development of a monochrome frame of image data. Alternatively, processor 1060 prior to subjecting a frame for further processing can interpolate pixel values intermediate of red pixel positions utilizing red pixel values for development of a monochrome frame of image data. Processor 1060 can alternatively, prior to subjecting a frame for further processing interpolate pixel values intermediate of blue pixel positions utilizing blue pixel values. An imaging subsystem of terminal 1000 can include image sensor 1032 and lens assembly 200 for focusing an image onto image sensor array 1033 of image sensor 1032.

In the course of operation of terminal 1000, image signals can be read out of image sensor 1032, converted, and stored into a system memory such as RAM 1080. Memory 1085 of terminal 1000 can include RAM 1080, a nonvolatile memory such as EPROM 1082 and a storage memory device 1084 such as may be provided by a flash memory or a hard drive memory. In one embodiment, terminal 1000 can include processor 1060 which can be adapted to read out image data stored in memory 1080 and subject such image data to various image processing algorithms. Terminal 1000 can include a direct memory access unit (DMA) 1070 for routing image information read out from image sensor 1032 that has been subject to conversion to RAM 1080. In another embodiment, terminal 1000 can employ a system bus providing for bus arbitration mechanism (e.g., a PCI bus) thus eliminating the need for a central DMA controller. A skilled artisan would appreciate that other embodiments of the system bus architecture and/or direct memory access components providing for efficient data transfer between the image sensor 1032 and RAM 1080 are within the scope and the spirit of the present invention.

Reference still to FIG. 5 and referring to further aspects of terminal 1000, imaging lens assembly 200 can be adapted for focusing an image of decodable indicia 15 located within a field of view 20 on the object onto image sensor array 1033. A size in target space of a field of view 20 of terminal 1000 can be varied in a number of alternative ways. A size in target space of a field of view 20 can be varied, e.g., by changing a terminal to target distance, changing an imaging lens assembly setting, changing a number of pixels of image sensor array 1033 that are subject to read out. Imaging light rays can be transmitted about an imaging axis. Lens assembly 200 can be adapted to be capable of multiple focal lengths and multiple planes of optimum focus (best focus distances).

Terminal 1000 may include illumination subsystem 800 for illumination of target, and projection of an illumination pattern (not shown). Illumination subsystem 800 may emit light having a random polarization. The illumination pattern, in the embodiment shown can be projected to be proximate to but larger than an area defined by field of view 20, but can also be projected in an area smaller than an area defined by a field of view 20. Illumination subsystem 800 can include a light source bank 500, comprising one or more light sources. Light source assembly 800 may further include one or more light source banks, each comprising one or more light sources, for example. Such light sources can illustratively include light emitting diodes (LEDs), in an illustrative embodiment. LEDs with any of a wide variety of wavelengths and filters or combination of wavelengths or filters may be used in various embodiments. Other types of light sources may also be used in other embodiments. The light sources may illustratively be mounted to a printed circuit board. This may be the same printed circuit board on which an image sensor integrated circuit 1040 having an image sensor array 1033 may illustratively be mounted.

Terminal 1000 can also include an aiming subsystem 600 for projecting an aiming pattern (not shown). Aiming subsystem 600 which can comprise a light source bank can be coupled to aiming light source bank power input unit 1208 for providing electrical power to a light source bank of aiming subsystem 600. Power input unit 1208 can be coupled to system bus 1500 via interface 1108 for communication with processor 1060.

In one embodiment, illumination subsystem 800 may include, in addition to light source bank 500, an illumination lens assembly 300, as is shown in the embodiment of FIG. 5. In addition to or in place of illumination lens assembly 300, illumination subsystem 800 can include alternative light shaping optics, e.g., one or more diffusers, mirrors and prisms. In use, terminal 1000 can be oriented by an operator with respect to a target, (e.g., a piece of paper, a package, another type of substrate, screen, etc.) bearing decodable indicia 15 in such manner that the illumination pattern (not shown) is projected on decodable indicia 15. In the example of FIG. 5, decodable indicia 15 is provided by a 10 barcode symbol. Decodable indicia 15 could also be provided by a 2D barcode symbol or optical character recognition (OCR) characters. Referring to further aspects of terminal 1000, lens assembly 200 can be controlled with use of an electrical power input unit 1202 which provides energy for changing a plane of optimum focus of lens assembly 200. In one embodiment, electrical power input unit 1202 can operate as a controlled voltage source, and in another embodiment, as a controlled current source. Electrical power input unit 1202 can apply signals for changing optical characteristics of lens assembly 200, e.g., for changing a focal length and/or a best focus distance of (a plane of optimum focus of) lens assembly 200. A light source bank electrical power input unit 1206 can provide energy to light source bank 500. In one embodiment, electrical power input unit 1206 can operate as a controlled voltage source. In another embodiment, electrical power input unit 1206 can operate as a controlled current source. In another embodiment electrical power input unit 1206 can operate as a combined controlled voltage and controlled current source. Electrical power input unit 1206 can change a level of electrical power provided to (energization level of) light source bank 500, e.g., for changing a level of illumination output by light source bank 500 of illumination subsystem 800 for generating the illumination pattern.

In another aspect, terminal 1000 can include a power supply 1402 that supplies power to a power grid 1404 to which electrical components of terminal 1000 can be connected. Power supply 1402 can be coupled to various power sources, e.g., a battery 1406, a serial interface 1408 (e.g., USB, RS232), and/or AC/DC transformer 1410.

Further, regarding power input unit 1206, power input unit 1206 can include a charging capacitor that is continually charged by power supply 1402. Power input unit 1206 can be configured to output energy within a range of energization levels. An average energization level of illumination subsystem 800 during exposure periods with the first illumination and exposure control configuration active can be higher than an average energization level of illumination and exposure control configuration active.

Terminal 1000 can also include a number of peripheral devices including trigger 1220 which may be used to make active a trigger signal for activating frame readout and/or certain decoding processes. Terminal 1000 can be adapted so that activation of trigger 1220 activates a trigger signal and initiates a decode attempt. Specifically, terminal 1000 can be operative so that in response to activation of a trigger signal, a succession of frames can be captured by way of read out of image information from image sensor array 1033 (typically in the form of analog signals) and then storage of the image information after conversion into memory 1080 (which can buffer one or more of the succession of frames at a given time). Processor 1060 can be operative to subject one or more of the succession of frames to a decode attempt.

For attempting to decode a barcode symbol, e.g., a one dimensional barcode symbol, processor 1060 can process image data of a frame corresponding to a line of pixel positions (e.g., a row, a column, or a diagonal set of pixel positions) to determine a spatial pattern of dark and light cells and can convert each light and dark cell pattern determined into a character or character string via table lookup. Where a decodable indicia representation is a 2D barcode symbology, a decode attempt can comprise the steps of locating a finder pattern using a feature detection algorithm, locating matrix lines intersecting the finder pattern according to a predetermined relationship with the finder pattern, determining a pattern of dark and light cells along the matrix lines, and converting each light pattern into a character or character string via table lookup.

Terminal 1000 can include various interface circuits for coupling various peripheral devices to system address/data bus (system bus) 1500, for communication with processor 1060 also coupled to system bus 1500. Terminal 1000 can include an interface circuit 1028 for coupling image sensor timing and control circuit 1038 to system bus 1500, an interface circuit 1102 for coupling electrical power input unit 1202 to system bus 1500, an interface circuit 1106 for coupling illumination light source bank power input unit 1206 to system bus 1500, and an interface circuit 1120 for coupling trigger 1220 to system bus 1500. Terminal 1000 can also include display 1222 coupled to system bus 1500 and in communication with processor 1060, via an interface 1122, as well as pointer mechanism 1224 in communication with processor 1060 via an interface 1124 connected to system bus 1500. Terminal 1000 can also include keyboard 1226 coupled to systems bus 1500 and in communication with processor 1060 via an interface 1126. Terminal 1000 can also include range detector unit 1210 coupled to system bus 1500 via interface 1110. In one embodiment, range detector unit 1210 can be an acoustic range detector unit. Various interface circuits of terminal 1000 can share circuit components. For example, a common microcontroller can be established for providing control inputs to both image sensor timing and control circuit 1038 and to power input unit 1206. A common microcontroller providing control inputs to circuit 1038 and to power input unit 1206 can be provided to coordinate timing between image sensor array controls and illumination subsystem controls.

A succession of frames of image data that can be captured and subject to the described processing can be full frames (including pixel values corresponding to each pixel of image sensor array 1033 or a maximum number of pixels read out from image sensor array 1033 during operation of terminal 1000). A succession of frames of image data that can be captured and subject to the described processing can also be "windowed frames" comprising pixel values corresponding to less than a full frame of pixels of image sensor array 1033. A succession of frames of image data that can be captured and subject to the above described processing can also comprise a combination of full frames and windowed frames. A full frame can be read out for capture by selectively addressing pixels of image sensor 1032 having image sensor array 1033 corresponding to the full frame. A windowed frame can be read out for capture by selectively addressing pixels or ranges of pixels of image sensor 1032 having image sensor array 1033 corresponding to the windowed frame. In one embodiment, a number of pixels subject to addressing and read out determine a picture size of a frame. Accordingly, a full frame can be regarded as having a first relatively larger picture size and a windowed frame can be regarded as having a relatively smaller picture size relative to a picture size of a full frame. A picture size of a windowed frame can vary depending on the number of pixels subject to addressing and readout for capture of a windowed frame.

Terminal 1000 can capture frames of image data at a rate known as a frame rate. A typical frame rate is 60 frames per second (FPS) which translates to a frame time (frame period) of 16.6 ms. Another typical frame rate is 30 frames per second (FPS) which translates to a frame time (frame period) of 33.3 ms per frame. A frame rate of terminal 1000 can be increased (and frame time decreased) by decreasing of a frame picture size.

In numerous cases herein wherein systems and apparatuses and methods are described as having a certain number of elements, it will be understood that such systems, apparatuses and methods can be practiced with fewer than the mentioned certain number of elements. Also, while a number of particular embodiments have been described, it will be understood that features and aspects that have been described with reference to each particular embodiment can be used with each remaining particularly described embodiment.

Another exemplary method of determining the dimensions of an object utilizes one or more of the foregoing methods to improve the accuracy of the method. In particular, the method includes capturing a range image of the object and capturing a visible image of the object (e.g., using a range camera with both an infra-red sensor and an RGB or monochrome camera). The range image and visible image are then aligned based on the relative positions from which the two images were captured.

In an exemplary embodiment, the method includes performing a first method of determining the object's dimensions based on either the range image or the visible image. The method then includes performing a second method of determining the object's dimensions based on the other image (i.e., not the image used in the first method). The results of the first and second methods are then compared. If the compared results are not within a suitable threshold, new images may be captured or the first and second methods may be performed again using the original images.

In another exemplary embodiment, the method includes simultaneously performing a first method of determining the object's dimensions based on the range image and a second method of determining the object's dimensions based on the visible image. When one of the methods determines one of the object's dimensions, the determined dimension is provided to the other method, and the other method adjusts its process for determining the object's dimensions. For example, the other method may assume the determined dimension to be correct or the other method may verify the determined dimension in view of the image it is using to determine the object's dimensions. In other words, the method performs both dimensioning methods simultaneously and dynamically. Such dynamic sharing of information between dimensioning methods facilitates the efficient determination of reliable dimensions of the object.

As would be recognized by one of ordinary skill in the art upon consideration of the present disclosure, the foregoing method may be implemented by an appropriately configured computing device (e.g., including a processor and memory).

The foregoing disclosure has presented a number of systems, methods, and devices for determining the dimensions of an object. Although methods have been disclosed with respect to particular systems and/or devices, the methods may be performed using different systems and/or devices than those particularly disclosed. Similarly, the systems and devices may perform different methods than those methods specifically disclosed with respect to a given system or device. Furthermore, the systems and devices may perform multiple methods for determining the dimensions of an object (e.g., to increase accuracy). Aspects of each of the methods for determining the dimensions of an object may be used in or combined with other methods. Finally, components (e.g., a range camera, camera system, scale, and/or computing device) of a given disclosed system or device may be incorporated into other disclosed systems or devices to provide increased functionality.

To supplement the present disclosure, this application incorporates entirely by reference commonly assigned U.S. patent application Ser. No. 13/784,933 for an "Integrated Dimensioning and Weighing System" filed Mar. 5, 2013 at the United States Patent and Trademark Office.

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. A terminal for measuring at least one dimension of an object, comprising:
   a pixel array;
   a range camera that projects a visible laser pattern of an outlined shape onto the object, the outlined shape corresponding to the range camera's field of view;
   a visible camera that produces a visible captured image of an area in which the object is located such that the outlined shape is within the visible camera's field of view;
   a processor, calculating from the visible image projected onto the pixel array, at least one divergence angle of the laser pattern, a number of pixels in the pixel array corresponding to the laser pattern, and at least one dimension of the object, wherein the divergence angle of the laser pattern is visible on the object and on the pixel array; and
   a display connected to said processor, wherein the display presents information associated with an optimal orientation of the range camera and visible camera with respect to the object, and wherein:
   the range camera's field of view is narrower than the visible camera's field of view; and
   the display presents (i) the visible image produced by the visible camera and (ii) an outlined shape on the displayed visible image corresponding to the range camera's field of view.

2. The terminal according to claim 1, further, wherein the display presents a crosshair target on the displayed visible image corresponding to an optical center of the range camera's field of view.

3. The terminal according to claim 1, wherein the outlined shape is a rectangle.

4. The terminal according to claim 1, further comprising an actuator configured to orient the range camera and visible camera with respect to the object based at least in part on the information associated with the optimal orientation of the range camera and visible camera with respect to the object.

5. The terminal according to claim 1, wherein the display presents a symbol on the displayed visible image corresponding to an optical center of the range camera's field of view.

6. The terminal according to claim 5, wherein the symbol comprises a crosshair target having three prongs.

7. The terminal according to claim 6, wherein: the object is a rectangular box; and
the display presents the three prongs of the crosshairs on the displayed visible image in an orientation that corresponds to the optimal orientation of the range camera and visible camera with respect to a corner of the rectangular box.

8. The terminal according to claim 1, wherein: the object is cylindrically shaped having a medial axis; and
the display presents a line on the displayed visible image in an orientation that corresponds to the optimal orientation of the range camera and visible camera with respect to the medial axis of the object.

9. The terminal according to claim 1, wherein:
the object is cylindrically shaped having a base; and
the display presents an ellipse on the displayed visible image in an orientation that corresponds to the optimal orientation of the range camera and visible camera with respect to the base of the object.

10. A terminal for measuring at least one dimension of an object, comprising:
a range camera that produces a range image of an area in which the object is located, said range camera also projecting a visible laser pattern onto the object, the laser pattern having an outlined shape corresponding to the range camera's field of view;
a visible camera that produces a visible captured image on a pixel array of an area in which the object is located such that the laser pattern is within the visible camera's field of view;
a processor calculating from the visible image at least one divergence angle of the laser pattern and a number of pixels in the pixel array corresponding to the laser pattern, the processor further calculating from an angle of an optical axis of the visible camera the at least one dimension of the object, wherein the divergence angle of the laser pattern is visible on the object and on the captured image; and
a display connected to said processor, wherein the display presents information associated with the optimal orientation of the range camera and visible camera with respect to the object;
wherein the range camera's field of view is narrower than the visible camera's field of view; and
the display presents (i) the visible image produced by the visible camera and (ii) an outlined shape on the displayed visible image corresponding to the range camera's field of view.

11. The terminal according to claim 10, wherein the outlined shape is a rectangle.

12. The terminal according to claim 10, wherein the display presents a crosshair target on the displayed visible image corresponding to an optical center of the range camera's field of view.

13. The terminal according to claim 10, wherein the display presents a symbol on the displayed visible image corresponding to an optical center of the range camera's field of view.

14. The terminal according to claim 13, wherein:
the object is a rectangular box;
the symbol comprises a crosshair target having three prongs; and
the display presents the three prongs of the crosshairs on the displayed visible image in an orientation that corresponds to the optimal orientation of the range camera and visible camera with respect to a corner of the rectangular box.

15. A terminal for measuring at least one dimension of an object, comprising:
a range camera that produces a range image of an area in which the object is located, said range camera also projecting a visible laser pattern onto the object, the laser pattern having an outlined shape corresponding to the range camera's field of view;
a visible camera that produces a visible captured image on a pixel array of an area in which the object is located such that the laser pattern is within the visible camera's field of view;
a processor calculating, from the visible image, coordinates in a coordinate system, said coordinates corresponding to break points in the laser pattern on the object, and the processor further calculating the at least one dimension of the object, wherein the break points of the laser pattern are visible on the object and on the captured image; and
a display;
wherein the display presents information associated with (i) the range camera's field of view and (ii) the visible camera's field of view and (iii) the optimal orientation of the range camera and visible camera with respect to the object.

16. The terminal according to claim 15, wherein:
the range camera's field of view is narrower than the visible camera's field of view; and
the display presents (i) the visible image produced by the visible camera and (ii) an outlined shape on the displayed visible image corresponding to the range camera's field of view.

17. The terminal according to claim 16, wherein the outlined shape is a rectangle.

18. The terminal according to claim 15, wherein the display presents (i) the visible image produced by the visible camera and (ii) a symbol on the displayed visible image corresponding to an optical center of the range camera's field of view.

19. The terminal according to claim 15, wherein:
the object is cylindrically shaped having a medial axis; and
the display shows (i) the visible image produced by the visible camera and (ii) a line on the displayed visible image in an orientation that corresponds to the optimal orientation of the range camera and visible camera with respect to the medial axis of the object.

20. The terminal according to claim 15, wherein:
the object is cylindrically shaped having a base; and
the display presents (i) the visible image produced by the visible camera and (ii) an ellipse on the displayed visible image in an orientation that corresponds to the optimal orientation of the range camera and visible camera with respect to the base of the object.

\* \* \* \* \*